US007603431B2

(12) United States Patent
Campbell et al.

(10) Patent No.: US 7,603,431 B2
(45) Date of Patent: Oct. 13, 2009

(54) SECURE TRANSPORT GATEWAY FOR MESSAGE QUEUING AND TRANSPORT OVER AN OPEN NETWORK

(75) Inventors: Eric Campbell, Rye, NH (US); Robert F Hoffman, Baldwin, NY (US); Robert Maloney, Jr., Massapequa Park, NY (US); Maris N Lemanis, Smithtown, NY (US); Andrew Mintzer, Fort Salonga, NY (US)

(73) Assignee: Bottomline Technologies (de) Inc., Portsmouth, NH (US)

( * ) Notice: Subject to any disclaimer, the term of this patent is extended or adjusted under 35 U.S.C. 154(b) by 848 days.

(21) Appl. No.: 11/081,033

(22) Filed: Mar. 12, 2005

(65) Prior Publication Data

US 2005/0160098 A1 Jul. 21, 2005

Related U.S. Application Data

(63) Continuation-in-part of application No. 10/979,045, filed on Nov. 1, 2004, and a continuation-in-part of application No. 10/879,233, filed on Jun. 29, 2004, and a continuation-in-part of application No. 10/139,596, filed on May 6, 2002, and a continuation-in-part of application No. 10/041,513, filed on Jan. 8, 2002, now abandoned.

(51) Int. Cl.
*G06F 15/16* (2006.01)

(52) U.S. Cl. ........................ 709/217; 709/218; 709/219

(58) Field of Classification Search .................. 709/217
See application file for complete search history.

(56) References Cited

U.S. PATENT DOCUMENTS

| | | | | |
|---|---|---|---|---|
| 6,216,173 | B1 * | 4/2001 | Jones et al. | 715/705 |
| 6,961,849 | B1 * | 11/2005 | Davis et al. | 713/167 |
| 7,003,781 | B1 * | 2/2006 | Blackwell et al. | 719/327 |
| 2002/0184349 | A1 * | 12/2002 | Manukyan | 709/221 |
| 2006/0168023 | A1 * | 7/2006 | Srinivasan et al. | 709/206 |

* cited by examiner

*Primary Examiner*—Jeffrey Pwu
*Assistant Examiner*—Willow Noonan
(74) *Attorney, Agent, or Firm*—Timothy P. O Hagan

(57) ABSTRACT

A system provides for the secure exchanging files with a remote transfer server over an open network such as the Internet. The system comprises a database storing file transfer parameters in association with identification of a remote file transfer client. The file transfer parameters include object destination parameters defining a processing call to a transfer server message queuing manager operating in conjunction with the transfer server. The processing call provides for delivery of the binary object to the transfer server message queuing manager in conjunction with a destination queue definition which provides for queuing the binary object within the defined queue for retrieval by a destination application. A transfer application coupled to the database comprises a plurality of file transfer methods available to remote file transfer clients making method calls thereto. The plurality of transfer methods comprise: i) an event definition method for providing to the remote transfer client the file transfer event parameters that are associated with the remote transfer client in response to receiving a method call from the remote transfer client; ii) an upload method for storing a binary object in a binary storage in response to receiving a method call from the remote transfer client that includes the binary object; and iii) a destination method for executing a processing call to the transfer server message queuing manager in response to receiving a method call from the remote transfer client that includes the object destination parameters, the processing call delivering the binary object from the binary storage to the transfer server method queuing manager in conjunction with the destination queue definition.

2 Claims, 23 Drawing Sheets

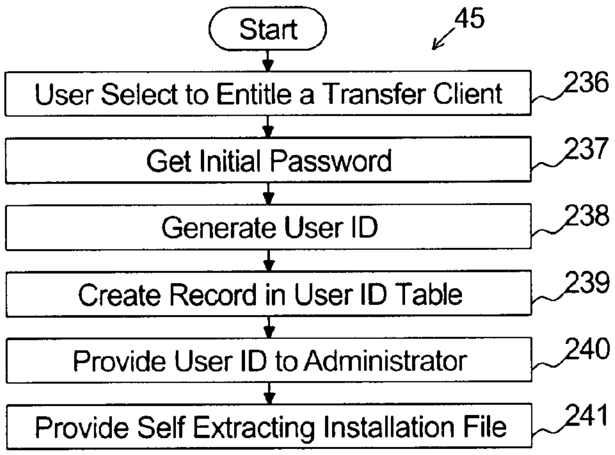
Figure 4
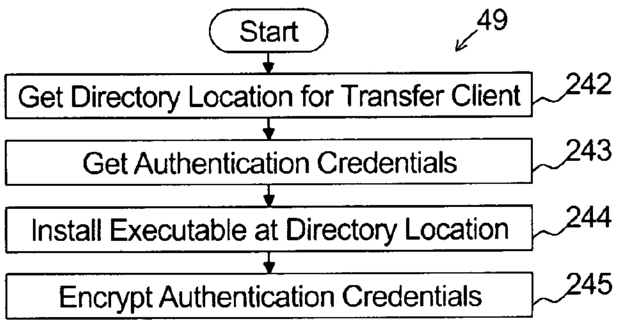
Figure 6
User ID 314
| Index 360 | Authentication Credentials 70 | | | Symetrical Key 359 | H.B. Interval 364 | Alert Instruction 367 | Session ID 368 | Session Life 370 | P.W. Life 372 | Event Change Flag 374 | Status Field 369 |
|---|---|---|---|---|---|---|---|---|---|---|---|
| | Transfer Client ID 362 | | Password 358 | | | | | | | | |
| | User Group ID 354 | User ID 356 | | | | | | | | | |
| | Group ID 71 | User ID 72 | Encrypted Password 82 | Symetrical Key 95 | Time Interval 78 | Notification Address 79 | Session ID 83 | Session Time 371 | P.W. Life Time 373 | Set | A |
| | | | | | | | | | | | I |
| | | | | | | | | | | | |
| | | | | | | | | | | | |
| | | | | | | | | | | | |
352
Figure 5

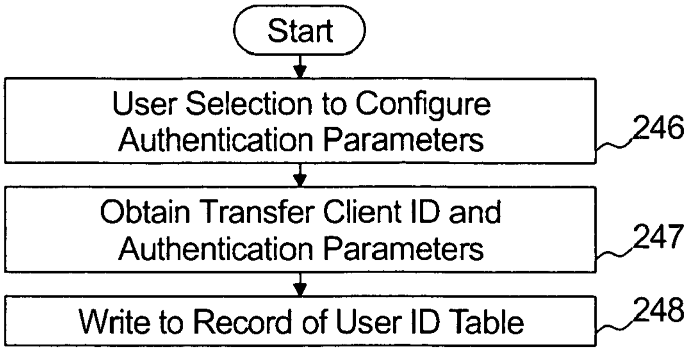
Figure 7
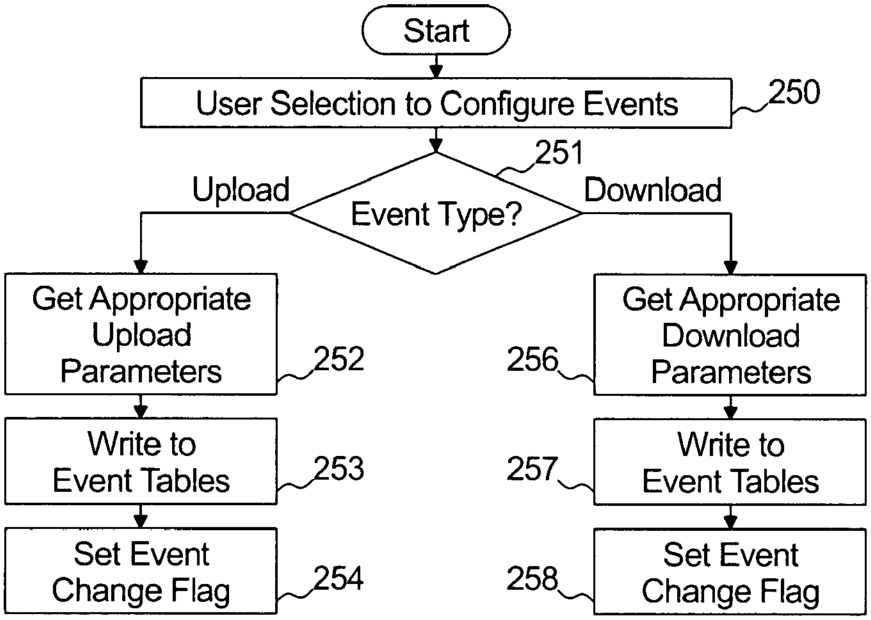
Figure 8
| Event Key Table 311 | | | |
|---|---|---|---|
| Index 360 | Transfer Client ID 362 | | Event Key 315 |
| | Group ID 354 | User ID 356 | |
| | Group ID 71 | User ID 72 | Event Key Value 80 |
| | | | |
| | | | |
| | | | |
313
Figure 9a

| Event Parameter Table 312 | | |
|---|---|---|
| Event Key 315 | Parameter ID 321 | Parameter Value 322 |
| 001 | MQ Get Parameter 323 | |
| 001 | Object Handling 326 | |
| 001 | MQ Put Parameter 325 | |
| 001 | Object Loading Rules 327 | |
| 001 | Status 328 | |
| | Email Address 101 | |
| | Email Code 102 | |
| | | |

320

Figure 9b

| Event Parameter Table 312 | | |
|---|---|---|
| Event Key 315 | Parameter ID 321 | Parameter Value 322 |
| | MQ Put Parameter 342 | |
| | Object Generation 344 | |
| | MQ Get Parameter 345 | |
| | Profile ID 347 | |
| | Extract Rules 349 | |
| | Class 351 | |
| | Offset 353 | |
| | Status 355 | |
| | Printer 352 | |
| | Print Code 354 | |
| | Email Address 101 | |
| | Email Code 102 | |

320

Figure 9c

| Email Codes 102 | |
|---|---|
| Code | Description |
| 01 | No Email Notification |
| 02 | Send on Success |
| 03 | Send on Failure |
| 04 | Send on Success or Failure |

100

Figure 10

| Available Printers 318 | | | |
|---|---|---|---|
| Index | Group ID 354 | User ID 356 | Printer ID 378 |
| | | | Printer ID 81 |
| | | | |
| | | | |
| | | | |

374

Figure 11

| Transfer Methods 51 | Parameters |
|---|---|
| Create Symetrical Key | User Group, User ID, T.C. Public |
| Log-On | User Group, User ID, Password |
| Heart Beat | Session ID |
| Change Password | Session ID, Old Password, New Password |
| Retrieve Active Event Keys | Session ID |
| Send Printers | Session ID, Printers IDs |
| Read Event | Session ID, Event Key |
| Update Event | Session ID, Event Key, Status Information, Offset |
| Create Object | Session ID, Profile ID, Extract Rules |
| Check for Message | Session ID, MQ Get Parameters |
| Check for Available Object | Session ID, Class, Offset |
| Download Object | Session ID, Object ID |
| Upload File | Session ID, File Name, Object Contents |
| Set Destination ID | Session ID, Object ID, MQ Put Parameters |
| Process Object | Session ID, Object ID, Loading Rules |

Figure 12

Ownership Table 62

| Index | Object ID Field 85 | Class Field 86 | Destination Group ID Field 87 | Offset Field 88 |
|---|---|---|---|---|
| | Object ID 89 | Class Value 90 | Destination Group ID 91 | Offset Table 92 |
| | | | | |
| | | | | |
| | | | | |
| | | | | |
| | | | | |

63

Heart Beat Audit Table 93

| T.C. ID 362 | Time Stamp 366 |
|---|---|
| | |
| | |
| | |
| | |
| | |
| | |
| | |
| | |

361

| Local Processes 23 | | |
|---|---|---|
| Index | Process | Parameters |
| 1 | Create Key | User Group, User ID |
| 2 | Log-On | User Group, User ID |
| 3 | Heart Beat | Session ID |
| 4 | Change Password | Session ID |
| 5 | Send Printers | Session ID, Printers IDs |
| 6 | Retrieve Active Event Keys | Session ID |
| 7 | Read Event | Session ID, Event Key |
| 8 | Update Event | Session ID, Event Key, Status Information, Offset |
| 9 | Create Object | Session ID, Profile ID, Extract Rules |
| 10 | Check for Available Object | Session ID, Class, Offset |
| 11 | Check for Message | Session ID, MQ Get Parameters |
| 12 | Download Object | Session ID, Object ID |
| 13 | Upload File | Session ID, File Name, Object Contents |
| 14 | Set Destination ID | Session ID, MQ Put Parameters |
| 15 | Process Object | Session ID, Object ID, Loding Rules |
| 16 | Save Password | Password |
| 17 | MQ Put (Local) | Local Definition of Destination |
| 18 | MQ Get (Local) | Queue Definition |
| 19 | Send to Printer | Printer ID, File Name |

Figure 31

Audit Table 312

| Index | TC ID 24 | Date 344 | Time 346 | Method Called 348 | Parameters Passed 350 |
|---|---|---|---|---|---|
| | | | | | |
| | | | | | |
| | | | | | |
| | | | | | |
| | | | | | |
| | | | | | |

342

Figure 41

SECURE TRANSPORT GATEWAY FOR MESSAGE QUEUING AND TRANSPORT OVER AN OPEN NETWORK

CROSS REFERENCE TO RELATED APPLICATIONS

The present application is a continuation in part of U.S. patent application Ser. No. 10/979,045 entitled A Secure WebServer System for Unattended Remote File and Message Transfer filed on Nov. 1, 2004, and is a continuation in part of U.S. patent application Ser. No. 10/879,233 entitled A Transfer Server of a Secure System for Unattended Remote File and Remote Message Transfer filed on Jun. 29, 2004 and is a continuation in part of U.S. patent application Ser. No. 10/041,513 entitled Automated Invoice Receipt and Management System with Field Value Substitution filed on Jan. 8, 2002 and is a continuation in part of U.S. patent application Ser. No. 10/139,596 entitled Automated Invoice Receipt and Management System with Automated Loading Systems filed on May 6, 2002.

TECHNICAL FIELD

The present invention relates to the exchange of data over an open network, and more particularly, to a secure transport system and method for the secure and automated exchange of data between data processing systems over the Internet.

BACKGROUND OF THE INVENTION

Database systems have long been used by businesses to record their commercial interactions with customers, vendors, financial institutions, and other third parties. Most database applications are transaction based—meaning that the application obtains all required data for a particular transaction before the transaction is written to the database.

Since the early days of database systems, it has long been a goal to automate the transfer of transaction data between the business's computer systems and those of the other third parties. Early methods of transferring transaction data between database systems included exporting data (in accordance with a defined report) from a first system onto a magnetic tape or other data media. The data media is then physically transferred to a second system. While such a system was an improvement over manual entry of data, several draw backs existed. First, physical transfer of the data media could take a significant amount of time if mail or courier was used. Secondly, the three steps of writing the data file to the data media, transferring the data media, and loading the data file from the data media all required human intervention to be properly performed. Thirdly, both the application on the first system and the application on the second system had to be compatible—or, stated another way, the data file written to the data media by the first system had to be in a format that could be read and loaded into the second system.

Development of modems, value added networks (VAN), and Internet networking in general significantly improved the data transfer process. Rather than physically transferring a data file on magnetic tape or other data media, the data file could be transferred using a dial up connection between the two computer systems, a VAN connection, or an Internet connection.

Using a dial up connection, a modem associated with the first system could dial and establish a PSTN telephone line connection with a modem associated with the second system. A user would be able to export the data file from the first system, transfer the data file to the second system over the PSTN connection, and a user of the second system could load the data file into the second system.

A VAN connection is quite similar to a dial-up connection with the exception that the PSTN connection is continually maintained (e.g. a leased line) through a value added intermediary for security. Transfer of a data file between the first system and the second system over a VAN may include the user of the first system exporting the data file, transferring the data file to the second computer system (through the value added intermediary) and a user of the second system loading the data file into the second system.

Subsequent development of the Internet and secure file transfer systems such as the Secure File Transfer Protocol (SFTP) has obsoleted dial up connection and value added intermediary technology for most data transfer applications. Utilizing the Internet and SFTP technology, the user of the first computer system would export the data file, log onto the SFTP server (that is networked to the second computer system), and upload the file to the SFTP server. The user of the second computer system would then retrieve the file from the SFTP server and load the file into the second computer system.

While transferring of files using dial up connections, VAN connections, and FTP file transfer are a significant improvement over use of magnetic media for transferring a data file, the two systems must still be compatible and human intervention is still required for the file transfer.

A separate field of technology known as web services is being developed to support platform independent processing calls over the Internet. Web Services are data processing services (referred to as methods) which are offered by a servicing application to a requesting application operating on a remote system.

The system offering the web services to requesting systems publishes a Web Service Description Language (WSDL) document which is an Extensible Markup Language (XML) document that describes the web service and is compliant with the Web Services Description Language (WSDL) protocol. The description of the web service may include the name of the web service, the tasks that it performs, the URL to which the method requests may be sent, and the XML structure and parameters required in a method request.

To obtain a published service, the requesting application sends a method call to the system as a Simple Object Access Protocol (SOAP) message within an HTTP wrapper. The SOAP message includes an XML method call which conforms to the required structure and parameters. So long as each system can build and interpret the XML data within the SOAP message within the HTTP wrapper, no compatibility between the two systems is required.

Web services enable applications to be written which request data from the web service providers. For example, a web server which provides stock quotes may publish the structure and parameters for requesting a stock quote, the method call may be required to include the ticker symbol corresponding to the requested quote. The web server system provides the information to the requesting application in response to receiving a method call for a method which the web service system publishes as available.

Web service systems are optimized for unattended transferring of XML method calls and responses between a system and a web service provider. However, the use of web service systems for transferring transaction data between two applications has at least two problems.

First, each of the two applications must be configured to manage the exchange of XML messages at the application level. For example, the client application must be configured with the appropriate information for contacting the web services server and the two applications must be appropriately configured for handling the timing of the transaction transfer and appropriate acknowledgments.

Secondly, web service technology is a transport technology that does not include any inherent security. The transfer of method calls using web services can be secured only if the applications include means for mutual authentication and means for encrypting the messages.

In yet another field of technology, middle ware systems known as message queuing systems have been developed to manage the transfer of data messages between two applications. When a first application (e.g. an origin application) sends a message to a second application, it uses a "MQPUT" processing call to transfer the message to a local message queuing manager. The message queuing manager places the message in a queue for delivery to the destination application. When the destination application is ready to receive a data message, it uses an "MQGET" to its local message queuing manager to retrieve the next message in the delivery queue.

The message queuing software: i) manages the transfer of messages between message queuing managers so that messages can be delivered across remote plafforms; and ii) enables both the origin application and the destination application to send and receive messages using their own schedule of events—thereby eliminating the need for each application to be responsive to the event timing needs of the other application.

While message queuing software handles timing and acknowledgement issues, message queuing technology, like web services technology, is a transport technology that does not include any inherent security. The transfer of messages through message queuing managers can be secured only if the origin and destination applications include means for mutual authentication and means for encrypting the messages.

At the most general level, what is needed is a solution that enables unattended transfer of data over an open network, such as the Internet, between two unattended applications, each operating on remote and secure network systems. More specifically, what is needed is a transport solution for securely transporting messages between the two systems in an unattended manner that that does not require each of the applications to include means for mutual authentication and means for message encryption.

SUMMARY OF THE INVENTION

A first aspect of the present invention is to provide a system for automated transfer of binary objects between a transfer client message queuing manager operating in conjunction with a remote file transfer client and a transfer server over the Internet. The system comprises a database and a transfer application coupled to the database.

The database stores file transfer parameters in association with identification of a remote file transfer client. The database further includes a user ID table storing transfer client authentication credentials in association with identification of the remote transfer client.

The file transfer parameters comprise object destination parameters defining a processing call to a transfer server message queuing manager operating in conjunction with the transfer server. The processing call provides for delivery of the binary object to the transfer server message queuing manager in conjunction with a destination queue definition which provides for queuing the binary object within the defined queue for retrieval by a destination application.

The transfer application comprises a plurality of transfer methods available to remote file transfer clients making method calls thereto. Exemplary transfer methods include i) a create key method; ii) a calculate symmetrical key method; iii) an event definition method; iv) an upload method; and v) a destination method.

The create key method operates in response to receiving a create key method call from the remote transfer client that includes a client public encryption key of a client public/private key pair. The method provides for i) calculating a symmetrical encryption key for use with a predetermined symmetrical encryption algorithm from the client public encryption key and a server private encryption key of a server public/private key pair; and ii) returning the server public key to the remote transfer client.

The session ID method operates in response to receiving a session ID method call from the remote transfer client that includes identification of the remote transfer client and its authentication credentials. The method provides for: i) assigning a session ID to a web services session with the remote transfer client only if the authentication credentials provided in the session ID method call match the authentication credentials stored in the database; ii) associating the session ID with the symmetrical encryption key; and iii) returning the session ID to the remote transfer client.

After completion of the create key method and the session ID method for a remote transfer client, each method call received from the remote transfer client will include the session ID and encrypted payload representing the method call. The encrypted payload will be encrypted using the symmetrical encryption key and the predetermined symmetrical encryption algorithm.

A security module of the transfer client, in response to receiving a method call, obtains the symmetrical encryption key associated with a session ID within the method call and uses the symmetrical encryption key and the predetermined symmetrical encryption algorithm to recover the method call from the encrypted payload.

The event definition method operates in response to receiving an event definition method call from the remote transfer client and, in response thereto, returning file transfer parameters that are associated with the remote transfer client in the database.

The upload method operates in response to receiving an upload method call from the remote transfer client that includes a binary object. The upload method provides for storing the binary object in a binary storage.

The destination method operates in response to receiving a destination method call from the remote transfer client that includes object destination parameters. The destination method provides for executing a processing call to the transfer server message queuing manager. The processing call delivers the binary object from the binary storage to the transfer server method queuing manager in conjunction with the destination queue definition of the object destination parameters.

In a sub embodiment, the session ID, when included in a method call, may be in an encrypted format. The security module recovers the session ID value from the encrypted format using an encryption key common to a plurality of remote transfer clients before obtaining the symmetrical encryption key associated with the session ID value. For example, if each of the plurality of remote transfer clients encrypts its session ID using the server public key, such value may be recovered using the server private key.

The file transfer parameters may further comprise object source parameters defining a processing call to be made by the remote transfer client to the transfer client message queuing manager. The processing call comprises a queue definition and provides for the transfer client message queuing manager to deliver a binary object from a queue associated with the queue definition to the remote transfer client.

For a better understanding of the present invention, together with other and further aspects thereof, reference is made to the following description, taken in conjunction with the accompanying drawings, and its scope will be pointed out in the appended claims.

BRIEF DESCRIPTION OF THE DRAWINGS

FIG. 4 is a flow chart representing exemplary operation of a configuration application in accordance with one embodiment of the present invention;

FIG. 5 is an exemplary User ID table in accordance with one embodiment of the present invention;

FIG. 6 is a flow chart representing exemplary operation of an installation client in accordance with one embodiment of the present invention;

FIG. 7 is a flow chart representing exemplary operation of a configuration module for enabling an authorized user to configure authentication parameters in accordance with one embodiment of the present invention;

FIG. 8 is a flow chart representing exemplary operation of a configuration module for enabling an authorized user to configure events in accordance with one embodiment of the present invention;

FIG. 9*a* is table representing an exemplary event key table in accordance with one embodiment of the present invention;

FIGS. 9*b*-9*c* are tables representing an exemplary event parameter table in accordance with one embodiment of the present invention;

FIG. 10 is a table representing exemplary email codes in accordance with one embodiment of the present invention;

FIG. 11 is a diagram representing an exemplary available printers table in accordance with one embodiment of the present invention;

FIG. 12 is a table representing exemplary transfer methods operated by the transfer server in accordance with one embodiment of the present invention;

FIG. 31 is a table representing exemplary local processes operated by the transfer client in accordance with one embodiment of the present invention;

FIG. 41 is a table representing an audit table in accordance with one embodiment of the present invention.

DETAILED DESCRIPTION OF THE INVENTION

Figure 1:
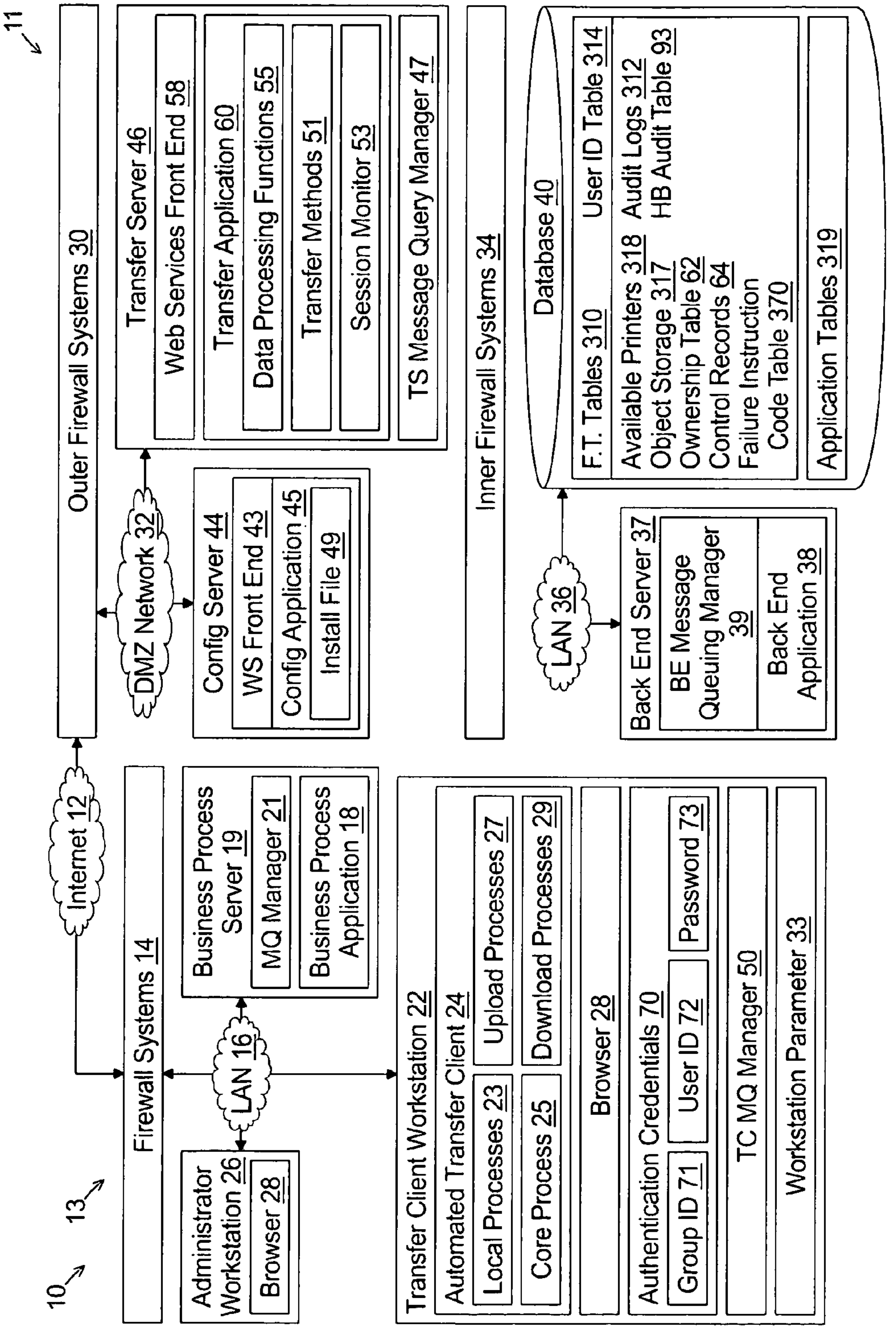
FIG. 1 is a block diagram of a system for secure and unattended file transfer in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

FIG. 1 illustrates exemplary architecture of system for secure and unattended remote file transfer (e.g. the remote file transfer system 10) over an open network such as the Internet 12 in accordance with one embodiment of the present invention. The remote file transfer system 10 comprises at least one host system 11 and at least one client system 13—each of which is coupled to the Internet 12.

Client System 13

The client system 13 comprises an administrator workstation 26, a transfer client workstation 22, and at least one business process application server 19. Each of the administrator workstation 26, the transfer client workstation 22, and the business process application server 19, may be communicatively coupled by an IP compliant local area network 16. The local area network 16 may be coupled to the Internet 12 by firewall systems 14.

Administrator Workstation 26

The administrator workstation 26 may be a known computer system with a known operating system (not shown), IP networking hardware and software (not shown), and a known secure hypertext transport protocol (HTTP) client such as a web browser 28 for establishing an HTTPS session to a URL associated with a web server (e.g configuration server 44) of the host system 11 and enabling a user to navigate web pages provided by the configuration server 44.

Business Process Server 19

The business process server 19 may operate: i) a known business process database system or enterprise resource management (ERP) system (e.g. a business process application 18) for recording business process and financial transactions; and ii) a known message queuing manager 21 which operates in the manner set forth in the background section of this application. (The message queuing manager 21 is referred to as the BP message queuing manager 21 herein to distinguish it from other message queuing managers present in the system 10).

The business process application 18 may be configured in a known manner to send data to, and receive data from, other applications through the BP message queuing manager 21 by making "MQGET" and "MQPUT" processing calls thereto as discussed.

More specifically with respect to receiving data from other applications, the business process application 18 periodically makes applicable "MQGET" processing calls to the BP message queuing manager 21 to obtain messages in which the business process application 18 is the specified destination—whether the origin is a local application (e.g. an application operating on the business process application server 19), a remote application operating on a system coupled to the local area network 16, or a remote application of the host system 11.

With respect to sending data to a local application (e.g. an application operating on the business process server 19) the business process application 18 makes an "MQPUT" processing call to the BP message queuing manager 21 specifying the local application as the message destination.

With respect to sending data to a remote application operating on a system coupled to the local area network 16 or a remote application of the host system 11, the business process application 18 makes an "MQPUT" processing call to the BP message queuing manager 21 specifying a local definition of the remote application.

In the case of a destination application operating on a system coupled to the local area network 16, the BP message queuing manager 21 routes the message to a message queuing manager (e.g. a local message queuing manager) operating on the system on which the destination application is located.

In the case of a destination application operating of the host system 11, the BP message queuing manager 21 routes the message to a message queuing manager 50 operating on the transfer client workstation 22 (referred to as the TC message queuing manager 50 herein to distinguish it from other message queuing managers present in the system 10) for subsequent secure transfer to the host system 11 in accordance with this invention.

Transfer Client Workstation 22

The transfer client workstation 22 may also be a known computer system with an operating system (not shown) and IP networking hardware and software (not shown). The workstation 22 operates: i) the TC message queuing manager 50 which is a known message queuing manager operating in the manner set forth in the background section of this application; ii) an unattended web services client application (e.g. transfer client 24); and iii) a known web browser 28.

In general, the web browser 28 is used by an administrator to: i) authenticate to a web server 44 of the host system 11; and ii) download and configure the transfer client 24 for operation.

In general, the transfer client 24 (after download and configuration by an administrator): i) maintains a secure web services session with a transfer server 46 of the host system 11; ii) obtains upload event and down load event parameters from a transfer application 60 of the transfer server 46; and iii) executes each upload event and down load event to effect the transfer of messages between the TC message queuing manager 50 and the transfer application 60.

More specifically with respect to each upload event, the transfer client 24: i) initiates an MQGET processing call to the TC message queuing manager 50 to obtain a message; and ii) provides the message to the transfer application 60 as encrypted payload of a simple object access protocol (SOAP) message during the secure web services session.

More specifically with respect to each download event, the transfer client 24: i) recovers the message from encrypted payload of a SOAP message received from the transfer application 60 during the secure web services session; and ii) initiates an MQPUT processing call to the TC message queuing manager 50 specifying a local definition of the destination application (such as the business process application 80) such that the TC message queuing manager 50 can deliver the message to the destination application.

Host System 11

The host system 11 comprises one or more back end servers 38; at least one web server (e.g. the configuration server 44), a transfer server 46, and a database 40. In the exemplary embodiment, the transfer server 46 and the configuration server 44 are coupled to an IP compliant network typically referred to as a DMZ network 32—which in turn is coupled to the Internet 12 by outer firewall systems 30 and coupled to an IP compliant local area network 36 by inner firewall systems 34. The configuration server 44 and the transfer server 46 may be operated on the same hardware system within the DMZ. The database 40 and the back end servers 38 may be coupled to the local area network 36.

Configuration Server 44

In general, the configuration server 44 may be structured as a known HTTPS web server which includes a known HTTPS front end 43 for establishing and maintaining an HTTPS session with a remote browser (such as browser 28 on either the administrator workstation 26 or the transfer client workstation 22) and a configuration application 45. The configuration application 45 is a menu driven application which interacts with file transfer tables 310 of the database 40 and, in general, provides sequences of web pages to the remote browser 28 thereby enabling an administrator to navigate menus and performs tasks associated with: i) entitling a transfer client 24, ii) downloading and installing a transfer client 24 on a transfer client workstation 22, iii) and posting a configuration of authentication events, upload events, and download events to be performed by the transfer client 24 to file transfer tables 310 of the database 40.

Operation of the configuration application 45 for performance of each of the above listed tasks is described in more detail with respect to FIGS. 4 through 8.

Transfer Server 46

In general, the transfer server 46 may comprise: i) a web services front end 58, ii) a transfer application 60, and iii) a known message queuing manager 47 which operates in the manner set forth in the background section of this application. (The message queuing manager 47 is referred to as the TS message queuing manager 47 herein to distinguish it from other message queuing managers present in the system 10).

The web services front end 58 may be a known web services front end which utilizes the simple object access protocol (SOAP) protocol for exchanging XML messages with remote systems (and in particular a transfer client 24 operating on the transfer client workstation 22) over the Internet 12.

In general, the transfer application 60 may, in combination with the web services front end 58, publish a WSDL document describing the data processing services (e.g. transfer methods 51) provided by the transfer server 60. Upon receiving a method call from a remote system (such as the unattended web services transfer client 24) for a published transfer method 51, the transfer application 60 executes the called transfer method 51.

The transfer methods 51 of the present invention include: i) authentication methods which are methods that enable a transfer client 24 to authenticate itself and establish a secure web services session with the transfer application 60; ii) event parameter methods which are methods that an enable a transfer client 24 to obtain transfer event parameters from the file transfer tables 310 of database 40 (as configured by an administrator using a browser 28, an HTTPS session with the configuration server 44, and web pages provided by the configuration application 45 as discussed above); iii) upload methods; and iv) download methods.

The upload methods may be methods that enable a transfer client 24 to upload files to the transfer application 60 and: i) invoke automated handling of the file by a data processing module 55 of the transfer application 60 (e.g. writing of business process and/or financial transaction data within the uploaded file to application tables 319 of the database 40); or ii) invoke transfer of the file, as a message, to the TS message queuing manager 47 for subsequent delivery to another application (either the back end application server 38 or another transfer client 24).

The download methods may be methods that enable a transfer client 24 to: i) invoke functions of the data processing module 55 for reading of business process and/or financial transaction data from the application tables 319 of the database 40 and encapsulation of such data as a data file; ii) invoke obtaining a message from a queue of the TS message queuing manager 47 and encapsulation of such message as a data file; and iii) downloading of the data file obtained from either the data processing module 55 or the TS message queuing manager 47.

Overview of Operation

Figure 2:
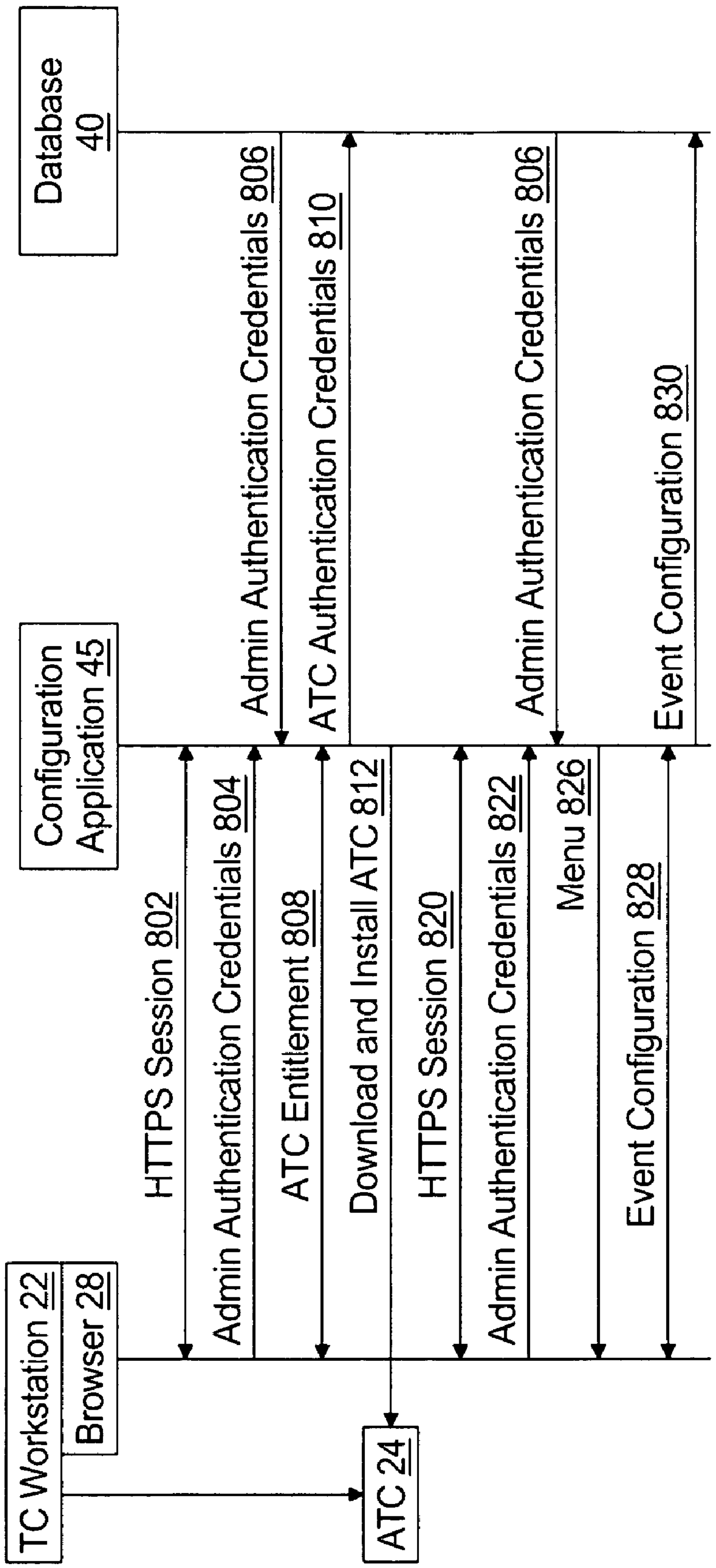
FIG. 2 is a ladder diagram representing the entitlement and configuration of an automated transfer client in accordance with one embodiment of the present invention.

The ladder diagram of FIG. 2 provides an overview of the interaction of the various components of the secure transport systems 10 for entitling a transfer client 24, downloading and installing a transfer client 24 onto a transfer client workstation 22, establishing authentication parameters for the transfer client 24, and scheduling upload events and download events for the transfer client 24.

In general, i) steps 802 through 812 comprise entitling a transfer client 24 and installing the transfer client 24 on a transfer client workstation 22; and ii) steps 820 through 830 comprise configuring authentication events, upload events, and download events for the transfer client 24 to perform.

Step 802 represents an administrator using the browser 28 of the transfer client workstation 22 to establish an HTTPS session with the configuration server 44. Through the HTTPS session, the administrator provides his or her authentication credentials (e.g. group ID, user ID, and password) at step 804.

At step 806 the configuration application 45 authenticates the administrator by retrieving authentication credentials from a user ID table 314 of the database 40 for comparison with the authentication credentials provided by the administrator.

Step 808 represents entitling a transfer client 24 upon selection of such a menu choice by the administrator. Step 808 includes generating transfer client authentication credentials for the transfer client 24. The transfer client authentication credentials may include a user ID for the transfer client 24 (the group ID may be the same group ID as the administrator) and generating or obtaining an initial password for the transfer client 24.

Step 810 represents writing a new record to a user ID table 314 such that when the transfer client 24 attempts to establish a web services session with the transfer server 46, it can be authenticated by the transfer application 60 by comparing authentication credentials provided by the transfer client 24 to those stored in the new record of the user ID table 314.

Step 812 represents providing a self extracting installation file through the HTTPS session and step 814 represents execution of the self extracting installation file on the transfer client workstation 22 thereby installing the transfer client 24.

Step 820 represents an administrator using a web browser to establish an HTTPS session with the configuration server 44. Use of browser 28 of the transfer client workstation 22 is represented in FIG. 2, however, use of the browser 28 of the administrator workstation 26 (or any other browser based system) can be readily used for configuring events for a transfer client 24.

Through the HTTPS session, the administrator provides his or her authentication credentials (e.g. group ID, user ID, and password) at step 822 and, at step 824, the configuration application 45 authenticates the administrator by retrieving authentication credentials from the user ID table 314 for comparison to authentication credentials provided by the administrator.

After authentication, the administrator will be presented with a menu at step 826 that enables the administrator to select configuration of: i) authentication events for a transfer client 24; ii) upload events for a transfer client 24; and iii) download events for a transfer client 24. Step 828 represents the exchange of web pages and data through the HTTPS session to configure authentication events, upload events, and download events.

After a transfer client 24 has been entitled and its events configured, it will continue to operate on the transfer client workstation 22 performing each configured event at its scheduled time.

Figure 3A:
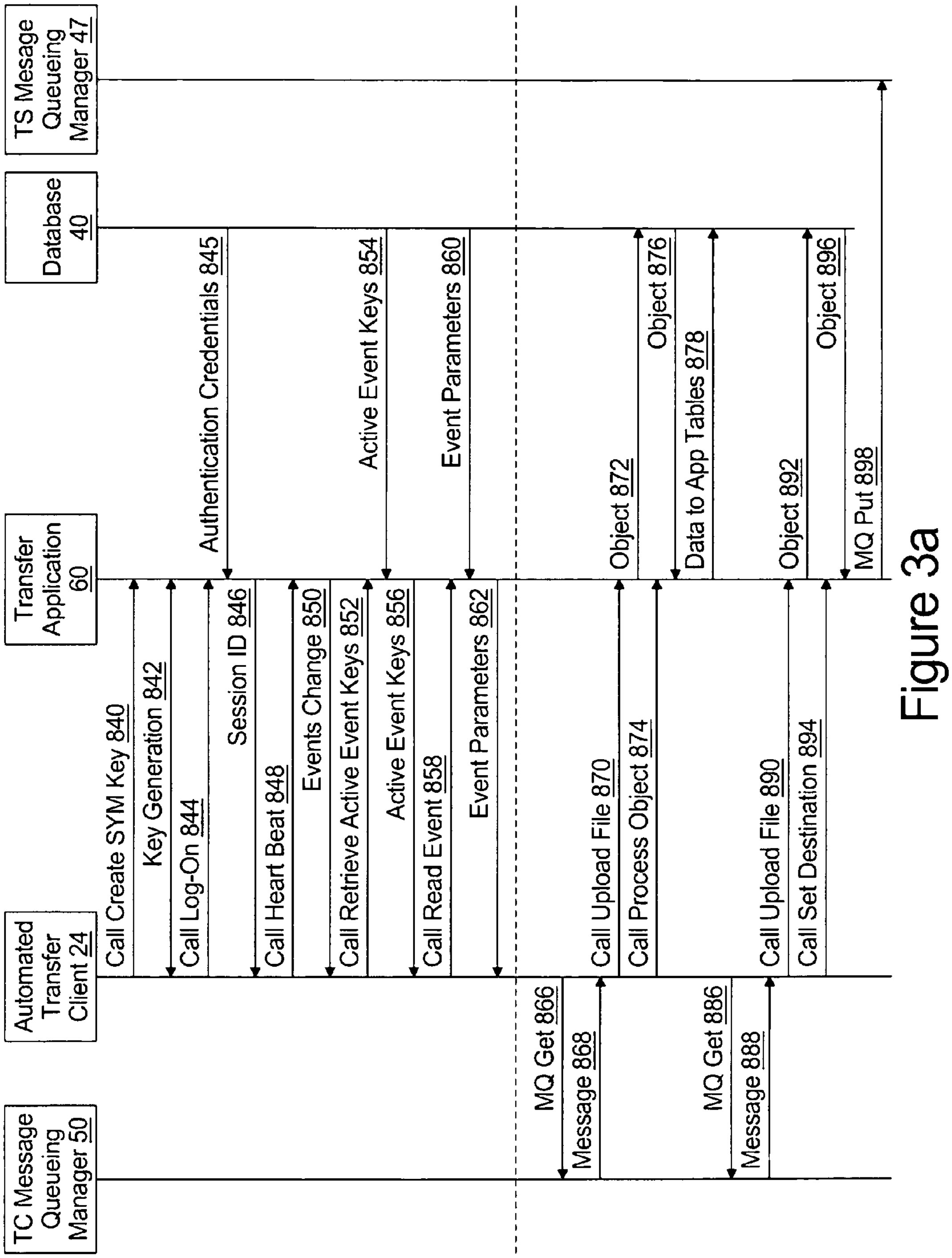
FIGS. 3*a* and 3*b* are ladder diagrams representing the secure and unattended transfer of files in accordance with one embodiment of the present invention.
Figure 3B:
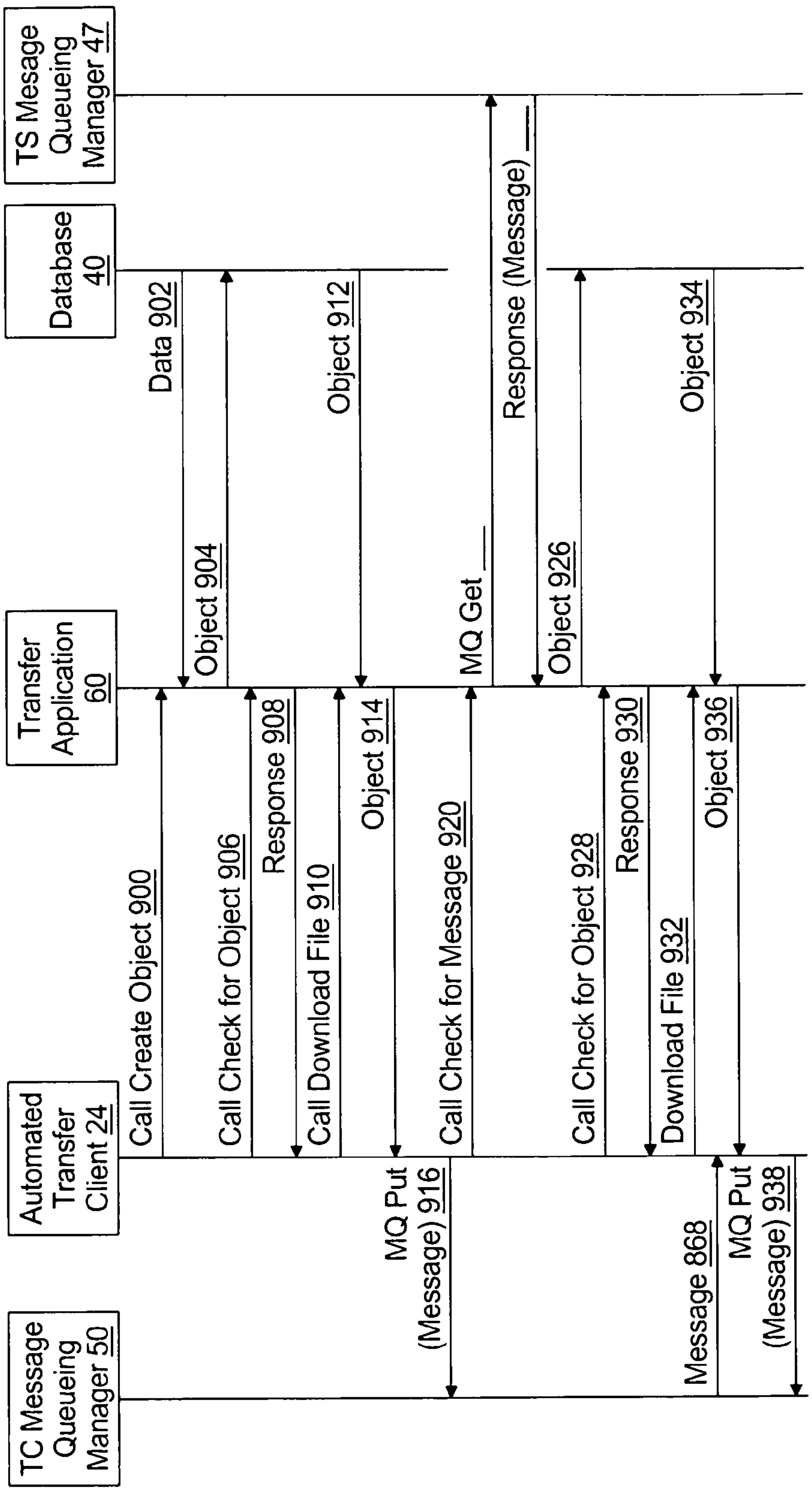

The ladder diagram of FIGS. 3*a* and 3*b* represents exemplary operation of the secure transport system 10 for: i) uploading files from the business process application 18 for writing to application tables 319 of the database 40 in accordance with a scheduled event; ii) uploading files from the business process application 18 for delivery to a back end application 38 in accordance with a scheduled event; iii) reading data from the application tables 319 and generating a file for downloading and transfer to the business process application 18 in accordance with a scheduled event; and iv) downloading files being provided by a back end application 38 for transfer to the business process application 18 in accordance with a scheduled event.

Steps 840 through 862 represents the transfer client 24 establishing a web services session with the transfer server 46 and obtaining its event parameters for each configured event. More specifically, at step 840, the transfer client 24 makes a "create symmetrical key" method call to the transfer application 60. Step 842 represents the exchange of messages (discussed in more detail with respect to FIG. 13) pursuant to the create key method call to establish a symmetrical encryption key using Diffie-Hellman techniques. The symmetric encryption key is used with a symmetric encryption algorithm for the secure exchange of data between the transfer client 24 and the transfer application 60.

Step 844 represents the transfer client 24 making a "log on" method call to the transfer application 60. In conjunction with the "log on" method call, the transfer client 24 provides its authentication credentials. Step 845 represents the transfer application 60 authenticating the transfer client 24 by retrieving authentication credentials from the user ID table 314 for comparison with those provided by the transfer client 24. If the transfer client 24 authenticates, the transfer server 60 returns a Session ID at step 846. The "log on" method is discussed in more detail with respect to FIG. 14.

Step 848 represents the transfer client 24 making a "heart beat" method call to the transfer application 60. As will be discussed in more detail with respect to FIG. 15, the heart beat method call is configured to enable the transfer server 60 to periodically reset the Session ID and password for the transfer client 24 for security reasons. The transfer server 60 also uses the heart beat method call to notify the transfer client 24 if its event parameters have changed. At the initial log on, and at any subsequent log on, when the event parameters have changed, the transfer server 60 will so indicate as represented by step 850.

Step 852 represents the transfer client 24 making a "retrieve active event keys" method call to the transfer application 60. As will be discussed in more detail with respect to FIG. 17, the retrieve active event keys method call enables the transfer client 24 to obtain a list of scheduled events (each identified by an event key) which have been configured for the transfer client 24 (by an administrator using a browser 18) and stored in the file transfer tables 310 of the database.

In response to receiving the "retrieve active event keys" method call, the transfer server 60 will retrieve all of the active event keys applicable to the transfer client 24 from the file transfer tables 310 of the database 40 at step 854 and, at step 856, provide those event keys to the transfer client 24.

After obtaining its active event keys, the transfer client 24 will obtain the event parameters associated with each event key by using a sequence of "read event" method calls to the transfer server 60. Each "read event" method call is used to obtain the parameters for a single upload event or download event associated with the method key.

Step 858 represents the transfer client 24 making a "read event" method call to the transfer server 60, step 860 represents the transfer server 60 obtaining the event parameters for the event identified in the method call from the file transfer tables 310. Step 682 represents the transfer server returning the event parameters to the transfer client 24.

After obtaining event keys for each event, the transfer client 24 executes each scheduled event. As discussed, generally there are four exemplary event types that the transfer client 24 may execute: i) uploading a file from the business process application 18 for writing to application tables 319 of the database 40; ii) uploading a file from the business process application 18 for subsequent delivery to a back end application 38 (or another transfer client 24); iii) reading of data from the application tables 319 and generation of a file for download and transfer to the business process application 18; and iv) download of a file provided by a back end application 38 (or another transfer client 24) and delivery to the business process application 18.

Steps 866 through 878 represents execution of an event to upload a file from the business process application 18 for writing to application tables 319 of the database 40.

Step 866 represents the transfer client 24 executing an MQGET processing call to the TC message queuing manager 50 and step 868 represents the TC message queuing manager 50 providing a message queued for delivery to the transfer client 24—such as a file generated by the business process application 18.

Step 870 represents the transfer client 24 making an "upload file" method call to the transfer server 60. One of the parameters of the "upload file" method call is a binary object representing the file. Step 872 represents the transfer server 60 storing the object in binary storage space 317 of the database 40.

Following upload, the transfer client 24 makes a "process object" method call to the transfer server 60. The "process object" method call invokes data processing functions 55 of the transfer server 60 to: i) retrieve the object from binary storage 317 (step 876); and ii) process the file represented by the object—which includes writing data to the application tables 319 of the database 40 (step 878).

Steps 886 through 898 represents execution of an event to upload a file from the business process application 18 for subsequent delivery to a back end application 38 or another transfer client 24.

Step 886 represents the transfer client 24 executing an MQGET processing call to the TC message queuing manager 50 and step 888 represents the TC message queuing manager 50 providing a message queued for delivery to the transfer client 24.

Step 890 represents the transfer client 24 making an "upload file" method call to the transfer server 60. One of the parameters of the "upload file" method call is a binary object representing the file. Step 892 represents the transfer server 60 storing the object in binary storage space 317 of the database 40.

Following upload, the transfer client 24 makes a "set destination ID" method call to the transfer server 60 at step 894. The set destination ID method call includes a local definition of a destination application (such as a back end application 38 or another transfer client 24) that is to receive the file. In response, the transfer application 60 retrieves the file from the object storage 317 (step 896) and executes an MQPUT processing call to the TS message queuing manager 47 to transfer the file (as a message) thereto (step 898).

The TS message queuing manager 47 completes delivery to the destination application using known systems for transfer of the file between message queuing managers and queuing of the file for retrieval by the back end application 38.

Steps 900 through 916 (FIG. 3*b*) represents execution of an event to read data from the application tables 319 and generate a file for download and transfer to the business process application 18.

Step 900 represents the transfer client 24 making a "create object" method call to the transfer application 60. In response to the "create object" the transfer application 60 executes data processing functions 55 (identified in the method call) for reading data from the application tables 319 of the database 40 and generating a binary object representing the file for download to the transfer client 24 (step 902). At step 904 the object is transferred to object storage 317.

Step 906 represents the transfer client 24 making a "check for available object" method call to the transfer application 60 to determine whether the file exists in the object storage 317. Because the process of reading data from the application tables 319 and building the binary object may take significant time, the transfer client 24 will periodically make "check for available object" method calls to the transfer application 60 until such time as the transfer application 60 provides a response indicating that a object is available—as represented by step 908.

After the object is available, the transfer client 24 makes a "download file" method call to the transfer application 60 at step 910. In response, the transfer application 60 obtains the object from the object storage 317 (step 912) and transfers the object to the transfer client 24 (step 914).

After receiving the object, the transfer client 24 initiates, at step 916, an MQPUT call to the TC message queuing manager 50 specifying a local definition of the business process application 18.

Steps 920 through 938 represent execution of an event to download a file provided by a back end application 38 (or another transfer client 24) for delivery to the business process application 18. Step 900 represent the transfer client 24 making a "check for message" method call to the transfer application 60. In response, the transfer application 60 executes an MQGET to the TS message queuing manager 47 (step 922), receives a message queued for delivery to the transfer client 24 (step 924), and stores the message, as a binary object, in the object storage 317 (step 926).

Step 928 represents the transfer client 24 making a "check for available object" method call to the transfer application 60 to determine whether the file exists in the object storage 317. Because there may not be a message available from the TS message queuing manager 47 and/or the process of obtaining the message and storing the message in the object storage 317 may take significant time, the transfer client 24 will periodically make "check for available object" method calls to the transfer application 60 until such time as the transfer application 60 provides a response indicating that an object is available—as represented by step 930.

After the object is available, the transfer client 24 makes a "download file" method call to the transfer application 60 at step 932. In response, the transfer application 60 obtains the object from the object storage 317 (step 934) and transfers the object to the transfer client 24 (step 936).

After receiving the object, the transfer client 24 initiates, at step 938, an MQPUT call to the TC message queuing manager 50 specifying a local definition of the business process application 18.

Entitling Transfer Client

The flow chart of FIG. 4 shows, in more detail, exemplary steps performed by the configuration application 45 for entitling a transfer client 24 and initially loading the transfer client 24 on a transfer client workstation 22.

After an HTTPS session has been established between the browser 28 of the transfer client workstation 22 and the server application 45 and after the administrator has been authenticated, the web pages provided by the configuration application 45 may present a selectable menu choice to entitle a transfer client 24. Step 236 represents the authorized user selecting to entitle a transfer client 24.

Step 237 represents the configuration application 45 presenting an applicable web page to obtain administrator entry of an initial password. More specifically, the web page comprises code for prompting the administrator to enter an initial password 73 into a form and posting the password to the configuration application 45 using HTTP post protocols.

Step 238 then represents the configuration application 45 generating a user ID 72 for the transfer client 24 and step 239 represents creating a record in a user ID table 314 within the database 40.

Turning briefly to FIG. 5 in conjunction with FIG. 4, an exemplary user ID table 314 is shown. The user ID table 314 includes a plurality of records 352, each identified by a unique index 360 and each of which includes the authentication credentials of an authorized administrator or an entitled transfer client 24. For each transfer client 24, the record 352 comprises a transfer client ID 362 which may comprise a separate group ID field 354 and a user ID field 356 for storing the group ID 71 and user ID 72 assigned to the transfer client 24 respectively. Additional fields include: i) a password field 358 for storing an encrypted representation of the then current password value 73 (e.g. the encrypted password 82) assigned to the transfer client 24, ii) a symmetrical key field 359 for storing a "shared secret" encryption key (e.g. Sym key 95) useful in combination with a predetermined symmetrical encryption algorithm for exchange of data between the transfer client 24 and the web services server 46 during a web services session; iii) a heart beat interval field 364 for storing a time interval 78 at which the transfer client 24 is to make periodic heart beat method calls to the web services server 46; iv) an alert instruction field 367 which identifies an email address or other notification address (e.g. notification address 79) to which notification is to be sent in the event that a transfer client 24 fails to make its scheduled heart beat method calls to the web services server 46; v) a session ID field 368 storing the most recent session ID 83 assigned to the transfer client 24; iv) a session life field 370 storing a session time 371 representing expiration of the then current session; v) a password life field 372 storing a password time 373 representing expiration of the then current password; vi) an event change flag field 374 storing a flag indicative of a change in the event parameter configuration associated with the transfer client 24; and vii) a status field 369 storing an "active" indicator if the transfer client 24 had been properly configured and authorized and storing an "inactive" indicator prior to authorization, if the transfer client 24 has failed to make its schedule heart beat method calls, or if a logon attempt has been made with an incorrect password. If the status field 369 is set "inactive", the transfer application 60 may not establish a web services session with the transfer client 24 until an authorized user intervenes.

Returning to step 239 of the flow chart of FIG. 4, writing a new record 352 to the user ID tables 314 comprises writing: i) the group ID 71 of the authorized administrator entitling the transfer client, ii) the user ID 72 generated by the configuration application 45 at step 238; and iii) the encrypted password 82 calculated from the password 73 obtained from the administrator at step 237.

In the exemplary embodiment, the encrypted password 82 is generated using an asymmetrical ciphering technique wherein the password 73 itself is the key for deciphering the encrypted password 82. As such, when a password 73 is provided by the transfer client 24, it may be used as a key for decrypting the encrypted password 82.

Step 240 represents providing a confirmation document to the browser 28 which includes at least the user ID 72 such that the authorized user has the group ID 71 (same as the group ID of the administrator), the user ID 72 (provided in the confirmation document), and the password 73 (input by the administrator).

Step 241 represents providing an executable self extracting installation file 49 to the transfer client workstation 22 which, when received by the transfer client workstation 22, launches installation components of the operating system to install the transfer client 24.

In the exemplary embodiment, the code for the transfer client 24 may be executable code or interpretable code conforming with Active X Protocols or virtual machine protocols such that the transfer client 24 operates within the operating system environment of the transfer client workstation 22 after installation.

Transfer Client Installation

At installation, certain parameters must be configured at the transfer client workstation 22 to enable the transfer client 24 to begin operating with the transfer application 60.

Turning briefly to FIG. 6 in conjunction with FIG. 1, exemplary operation of the installation file 49 is shown. Step 242 represents obtaining user selection of a directory location for storing the transfer client 24 and step 243 represents obtaining user input of the authentication credentials (group ID 71, user ID 72, and password 73) for the transfer client 24.

Step 244 represents installing the executable files of the transfer client 24 at the chosen directory location and step 245 represents encrypting the group ID 71, a user ID 72, and password 73 (e.g. the authentication credentials 70) using workstation parameters 33 for storage in volatile memory. Storage in volatile memory assures that the authorization credentials 70 are lost if the transfer client workstation 22 is powered down. Encryption using an encryption key which is generated using workstation parameters 33 such as a network card ID, an IP address, or other values unique to the workstation 22 assures that the authentication credentials 70 can not be deciphered on any other machine.

Transfer Client Configuration (Authentication Parameters and Event Parameters)

The flow chart of FIG. 7 represents exemplary steps performed by the configuration application 45 to enable an administrator to configure authentication parameters. It should be appreciated that configuration may be performed initially upon entitling the client 24 and at times thereafter when update is appropriate.

Turning to FIG. 7 in conjunction with FIG. 1, the administrator initiates configuration of authentication parameters by directing the browser 28 to an applicable URL of the web server 44 and, after receiving applicable menu web pages, selects a menu choice associated with authentication parameter configuration. Step 246 represents the configuration application 45 receiving administrator selection of a menu choice to configure authentication parameters of a transfer client 24.

Step 247 represents providing web pages for: i) administrator identification of a transfer client 24 (by its group ID 71 and user ID 72) and selection (or entry) of authentication parameters applicable to the identified transfer client 24; and ii) posting of such information to the configuration application 45.

Step 248 represents writing such authentication parameters to the record 352 of the user ID table 314 (FIG. 5) that corresponds to the identified transfer client 24. More specifically, the web pages enable the administrator to provide: i) a time interval value 78 (typically one minute) for storage in the interval field 364 of the user ID table 314; ii) a notification address 79 for writing to the alert instruction field 367; iii) a session expiration interval (on the order of one minute) useful for calculating a session life time 371 for writing to the session life field 370; and iv) a password expiration interval (on the order of one minute) useful for calculating a password life time 373 for writing to the password life field 372.

As discussed, the administrator configures event parameters for each event within the automated file transfer tables 310 of the database 40 using a sequence of web pages provided by the configuration application 45 of the web server 44 and the transfer client 24 obtains all if its instructions and parameters related to each upload event and each download event from the transfer application 60—which reads such instructions and parameters from the transfer tables 310.

The flow chart of FIG. 8 represents exemplary steps performed by the configuration application 45 to enable an administrator to configure file transfer event parameters. Again, it should be appreciated that configuration may be performed initially upon entitling the client 24 and at times thereafter when update is appropriate.

Referring to FIG. 8 in conjunction with FIG. 1, the administrator initiates configuration of file transfer events by directing the browser 28 to an applicable URL of the web server 44 and, after receiving applicable menu web pages, selects a menu choice associated with event configuration. Step 250 represents the configuration application 45 receiving administrator selection of a menu choice to configure events.

If, at step 251, the event to be configured is an upload event, steps 252 through 254 are performed and if the event to be configured is a down load event, steps 256 through 258 are performed.

Step 252 represents providing applicable web pages (or executable code) to the browser 28 to: i) obtain user identification of a transfer client 24 to which the upload event is associated and input and/or selection of upload event parameters necessary for populating the exemplary upload event fields of an event parameter table; and ii) post such values back to the configuration application 45.

Turning briefly to FIG. 9*a*, an exemplary event key table 311 is shown. The event key table 311 includes a plurality of records 313. Each record 313 associates an event with the group ID 71 and user ID 72 of transfer client 24 that is to execute the event. The event is identified by an event key value 80 stored in an event key field 315.

Turning briefly to FIG. 9*b*, an exemplary event parameter table 312 (populated with upload event parameters) is shown. The table 312 includes a plurality of records 320. Each record includes an event key field 315, a parameter ID field 321, and a parameter value field 322. Each event parameter value is stored in a separate record 320 in the event parameter table 312 and is identified by an event parameter ID stored in the event parameter ID field 321. Both the parameter ID field 321 and the parameter value field 322 are text fields such that the information stored therein can be assembled as an XML file for providing to a transfer client 24 (Step 170 of FIG. 32 discussed herein). The event to which the parameter associates is identified by its event key value 80 stored in the event key field 315.

The exemplary upload event parameters which may be associated with an upload event include: i) an MQGET parameter 323; ii) a object handling field 326 identifying whether the file, after uploading is to be queued (as a message) for delivery to another system or loaded by the transfer application 60 (as data) into the application tables 319; iii) an MQPUT parameter 325 if the file, after uploading is to be queued for delivery to another system; iv) object loading rules 327 identifying a local data processing function 55 and parameters for calling such local data processing function 55 for loading the file into the application table 319 if handling by the transfer application 60 is applicable; v) a status parameter 328 identifying the then current status of the event (such as whether the event has started, the time started, the event is completed, the time completed, the event was aborted, or the time aborted); vi) an email address 101 identifying an address to which a notification email is to be sent; and vii) an email code 102 identifying conditions for sending the email notification.

The MQGET parameter 323 comprises all data necessary for the transfer client 24 to initiate an MQGET processing call to the TC message queuing manager 50 and obtain a message in a queue identified within the processing call.

The MQPUT parameter 325 comprises all data necessary for the transfer application 60 to initiate an MQPUT processing call to the TS message queuing manager thereby directing the message to a queue identified in the processing call for subsequent retrieval by another system.

Turning briefly to FIG. 10, exemplary email codes 102, as stored as records in an email codes table 102, include an email code 01 for no email notification (in which case the email address field 96 may be blank), an email code 02 for sending a notification email upon successful completion of the event; an email code 03 for sending an email upon failure to successfully complete the event; and an email code 04 for sending an email upon either success completion of, or failure to successfully complete, the event.

Returning to FIG. 8, step 253 represents creating applicable records in the event key table 311 of FIG. 9*a* and the event parameter table 312 of FIG. 9*b*.

Step 254 represents setting the event change flag in the event change flag field 374 of the record 352 that corresponds to the transfer client 24 in the user ID table 314.

Step 256 represents providing applicable web pages (or executable code) to the browser 28 to: i) obtain user identification of a transfer client 24 to which the download event is associated and input and/or selection of download event parameters necessary for populating the exemplary download event fields of an event parameter table; and ii) post such values back to the configuration application 45.

Turning briefly to FIG. 9*c*, an exemplary event parameter table 312 (populated with download event parameters) is shown. Exemplary event parameters which may be associated with a download event include: i) an MQPUT parameter 342; ii) a object generation parameter 345 which identifies whether the object is to be generated by a data processing functions 55 of the transfer application 60 by reading data from the application table 319 (e.g. a data down load event) or whether the object is a message to be retrieved from the TS message queuing manager 47 using an MQGET processing call (e.g. a message down load event); iii) an MQGET parameter 345 if the event is a message down load event; iv) a profile ID 347 and extract rules 349 which are instructions for generating the object based on data from the application tables 319 if the event is a data processing download event; v) a class 351 and offset 353 for identifying the object in the ownership tables 62; vi) a status parameter identifying the then current status of the event (such as whether the event has started, the time started, the event is completed, the time completed, the event was aborted, or the time aborted); vii) an email address 101 identifying an address to which a notification email is to be sent; viii) an email code identifying conditions for sending the email notification; ix) a printer field 352; and x) a print code field 354. The print code field 354 stores an indication of whether a file should automatically be sent to a printer upon download. The printer field 352 identifies the specific printer to which the file should be sent.

The MQPUT parameter 342 comprises all data necessary for the transfer client 24 to initiate an MQPUT processing call to the TC message queuing manager 50 and thereby direct the message to a queue identified within the processing call—for subsequent retrieval by another system.

The MQGET parameter 345 comprises all data necessary for the transfer application 60 to initiate an MQGET processing call to the TS message queuing manager 47 thereby obtaining a message previously directed to such queue by another system (e.g the back end application server 38 or another transfer client 24).

Turning briefly to FIG. 11, the available printers table 318 includes a plurality of records 374. Each record associates a printer (identified by its printer ID value 81 in a printer ID field 378) with the group ID 71 and user ID 72 of a transfer client 24. As will be discussed, each transfer client 24 periodically updates the available printers table 318 such that an authorized user may configure download events in a manner that provides for the transfer client 24 to automatically send the downloaded file to an available printer.

Returning to FIG. 8, step 257 represents creating applicable records in the event key table 311 of FIG. 9*a* and the event parameter table 312 of FIG. 9*c*.

Step 258 represents setting the event change flag in the event change flag field 374 of the record 352 that corresponds to the transfer client 24 in the user ID table 314.

Web Services Server

As discussed, the transfer methods 51 of the present invention include: i) authentication methods which are methods that enable a transfer client 24 to authenticate itself and establish a secure web services session with the transfer application 60; ii) event parameter methods which are methods that an enable a transfer client 24 to obtain transfer event parameters from the file transfer tables 310 of database 40 (as configured by an administrator using a browser 28, an HTTPS session with the configuration server 44, and web pages provided by the configuration application 45 as discussed above); iii) upload methods; and iv) download methods.

Turning briefly to FIG. 12, an exemplary listing of the transfer methods 51 which are performed by the transfer server 60 are shown. These methods, in the aggregate, provide for the automated file transfer systems as discussed above. The steps executed to perform each transfer method 51 are discussed with respect to one of the flow charts of FIGS. 13 through 27.

Create Key Method

Figure 13:
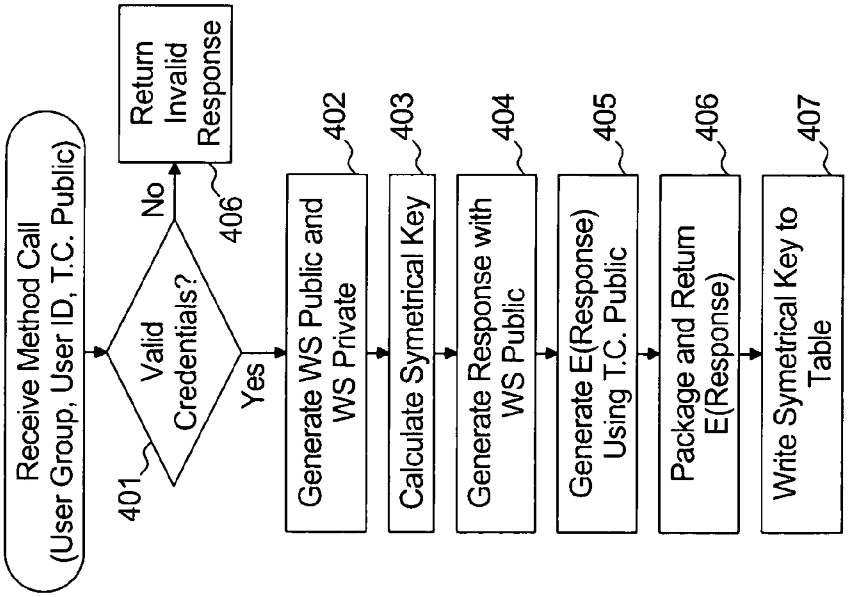

The flow chart of FIG. 13 represents a transfer method 51 called Create Key which is executed by the transfer application 60 in response to receiving a Create Key method call from a transfer client 24. The Create Key method call includes parameters such as a group ID 71, a user ID 72, and a public encryption key (TC Public) of a public/private key pair generated by the transfer client for purposes of calculating a symmetrical encryption key (referred to as Sym Key) which will become a shared secret key for the duration of the web services session.

Step 401 represents determining whether the group ID 71 and the user ID 72 provided by the transfer client 24 match an active transfer client 24 in the User ID table 314 (e.g. whether a record 352 is associated with the group ID 71 and the user ID 72 and whether the status field 369 of such record indicates that the transfer client 24 is active).

If the value of the status field 369 represents that the transfer client 24 is inactive, the transfer client 24 either has not been authorized or has attempted to authenticate with an incorrect password. In either case, the transfer client 24 is not permitted to establish a web services session with the transfer application 60 until such time as the value of the status field 369 has been returned to active. Therefore, if the transfer client 24 does not exist in the user ID table 314 or is not active, a response indicating invalidity is returned at step 406.

If the transfer client 24 is active: i) the transfer application 60 generates a public/private encryption key pair (e.g. WS Public and WS Private) for use with a predetermined asymmetrical encryption algorithm at step 402; and iii) calculates the Sym Key from the combination of WS Private and the TC Public for use with a predetermined symmetric encryption algorithm at step 403.

WS Public and WS Private are determined by generating a random integer value which is WS Private and deriving WS Public there from. WS Public is then calculated as the result of as:

$$WS\ \text{Public}=G^{(WS\ Private)}modP.$$

The value of "G" is a predetermined integer value referred to as a generator and "P" is a predetermined large prime number—neither of which is secret.

TC Public was similarly calculated by the transfer client 24 using its on random number (TC Private) and the predetermined value of G and P. The Sym Key is calculated by the transfer server 60 executing the Create Symmetrical Key method as:

$$Sym\ \text{Key}=(TC\ \text{Public})^{(WS\ Private)}modP.$$

Step 404 represents generating an XML response message for return to the transfer client 24. The XML response message will include WS Public as a parameter to enable the transfer client 24 to calculate Sym Key using a corresponding algorithm wherein:

$$Sym\ \text{Key}=(WS\ \text{Pubic})^{(TC\ Private)}modP.$$

Step 405 represents encrypting the XML response message (including the WS Public value) using the predetermined asymmetrical encryption algorithm and TC Public as the encryption key.

Step 406 represents packaging the encrypted XML response as a SOAP message and returning such SOAP message to the transfer client 24 making the processing call to the transfer application 60.

Step 407 represents writing Sym Key to the Sym Key field 359 of the record 352 in the user ID table 314 (FIG. 5) which corresponds to the transfer client 24 making the create Sym Key method call.

Log-On Method

Figure 14:
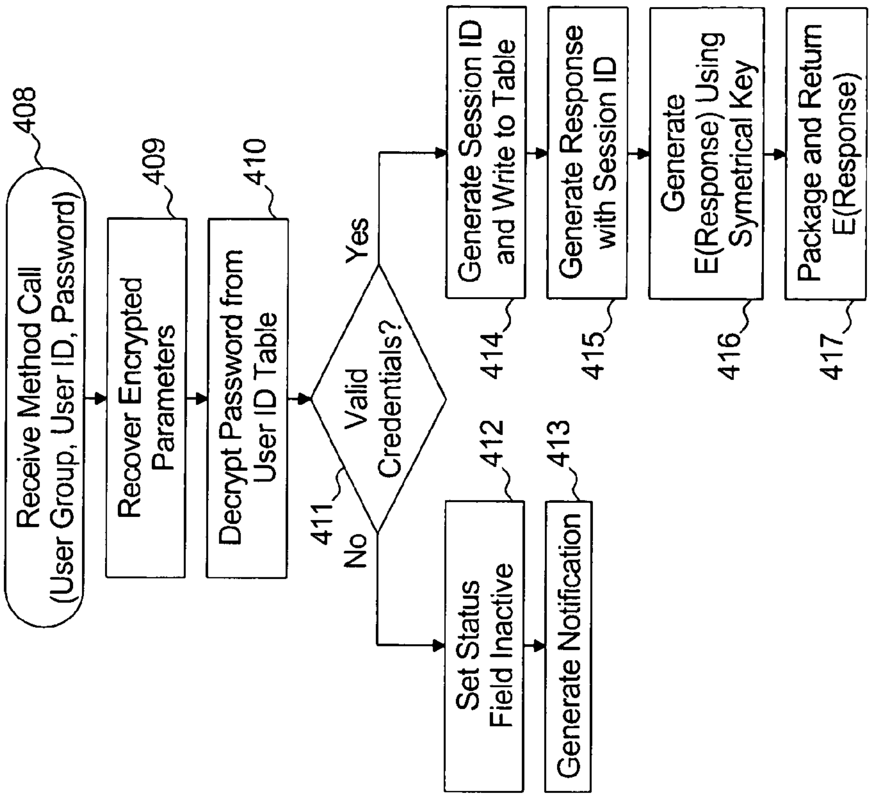
FIGS. 13 through 27 represent operation of an exemplary transfer method operated by the transfer server in accordance with one embodiment of the present invention.

The flow chart of FIG. 14 represents a transfer method 51 called Log-On which is executed by the transfer application 60 in response to receiving a Log-On method call from a transfer client 24. The Log-On method call includes parameters such as the group ID 71, the user ID 72, and the then current password value 73. The parameters are part of the XML message comprising the processing call and are encrypted using either the asymmetric encryption algorithm and TS public or a combination of: i) the asymmetric algorithm and TS public; and ii) the symmetrical encryption algorithm and the Sym Key.

Step 409 represents the transfer application 60 using the asymmetrical encryption algorithm and TS private to recover the parameters.

Step 410 represents: i) retrieving the encrypted password value 82 from the record 352 of the user ID table 314 which corresponds to the group ID 71 and the user ID 72; and ii) decrypting the encrypted password value 82. As discussed, the encrypted password 82 is generated using an asymmetrical ciphering technique wherein the password 73 itself is the key for deciphering the encrypted password 82. As such, when a password 73 is provided by the transfer client 24, it may be used as a key for deciphering the encrypted password 82. If the password 73 matches the deciphered value, then the password provided by the transfer client 24 matches the original password which was encrypted into the encrypted password 82 and stored in the user ID table 314.

Step 411 represents determining whether the password value 73 provided by the transfer client 24 matches the result of deciphering the encrypted password value 82. If there is a match, a Session ID 83 is generated and written to the Session ID field 368 of the user ID table 314 at step 414.

Step 415 represents generating an XML response message for return to the transfer client 24. The XML response message will include the Session ID 83 as a parameter.

Step 416 represents encrypting the XML response message (including the Session ID 83) using the symmetrical encryption algorithm.

Step 417 represents packaging the encrypted XML response as a SOAP message and returning such SOAP message to the transfer client 24 making the processing call to the web services server 46.

Alternatively, if the password value 73 provided by the transfer client 24 does not match the result of deciphering the encrypted password 82 at decision box 411, the status field 369 of the record 352 is set to "Inactive" at step 412 and notification is sent to the notification address 79 as stored in the alert instruction field 367 of the record 352 at step 413. In the exemplary embodiment, the notification address 79 will be an email address to which certain information about the failure is sent. The information may include the group ID 71 and the user ID 72.

It should be appreciated that following log on, all method calls and responses exchanged between the transfer client 24 and the transfer application 60 are encrypted using the symmetric encryption algorithm and Sym Key with the exception being that the Session ID when included in a method call from the transfer client 24 to the transfer server 46 will be encrypted using the asymmetric encryption algorithm and TS public. This enables the transfer server 46 to recover the Session ID using the asymmetric encryption algorithm and TS private no matter which of multiple transfer clients 24 may have sent the method call. Then, after recovering the Session ID, the transfer server 46 may look up Sym Key associated with the Session ID for recovering the remainder of the parameters of the method call.

Heart Beat Method

Figure 15:
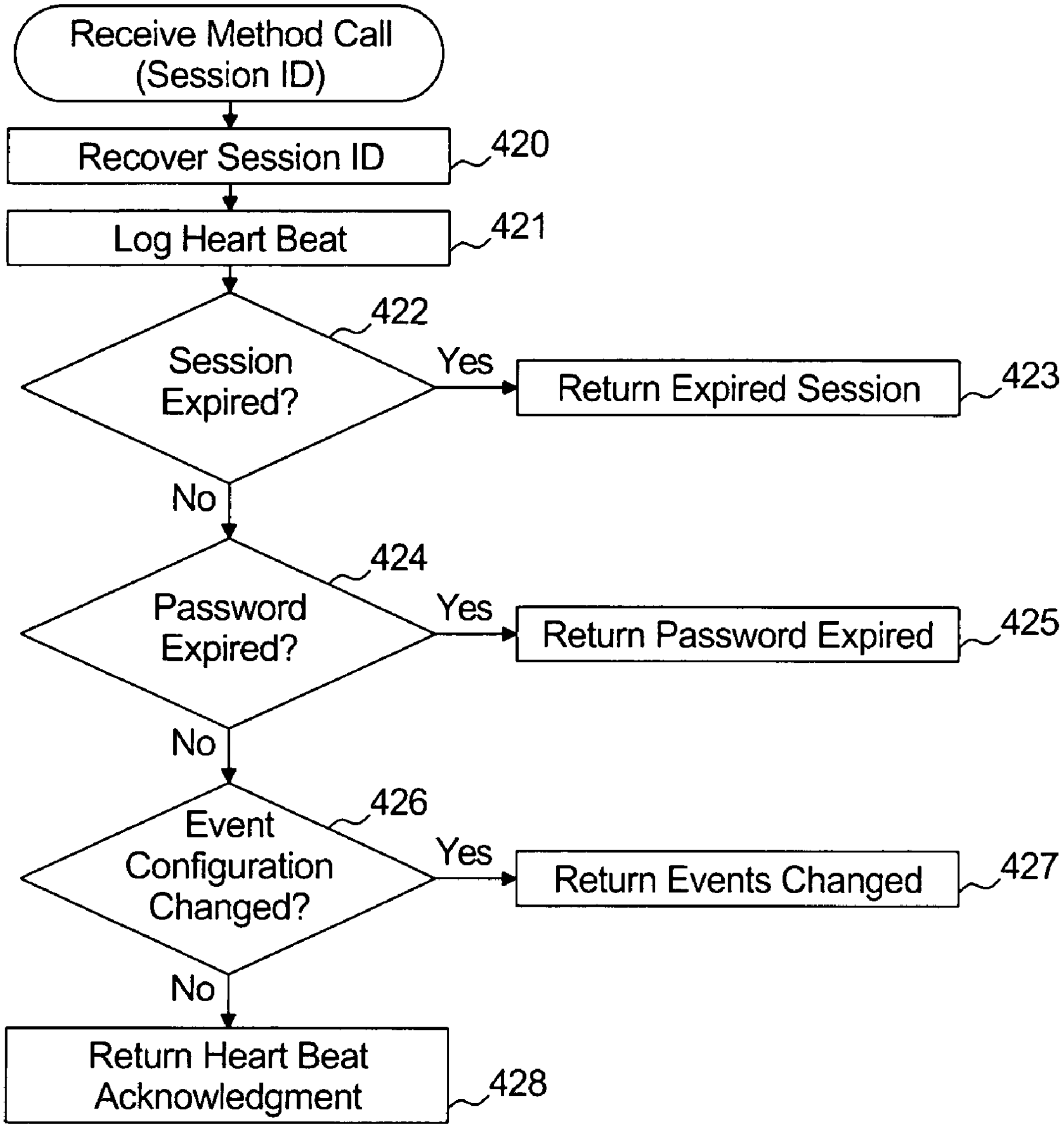

The flow chart of FIG. 15 represents a transfer method 51 called Heart Beat which is executed by the transfer application 60 in response to receiving a Heart Beat method call from a transfer client 24. The Heart Beat method call is an XML message which includes the Session ID as its parameter.

Step 420 represents the transfer application 60 using the asymmetric encryption algorithm and TS private to recover the Session ID and the symmetrical encryption algorithm and the Sym Key to decipher the XML processing call.

Figures 28, 29, 30:
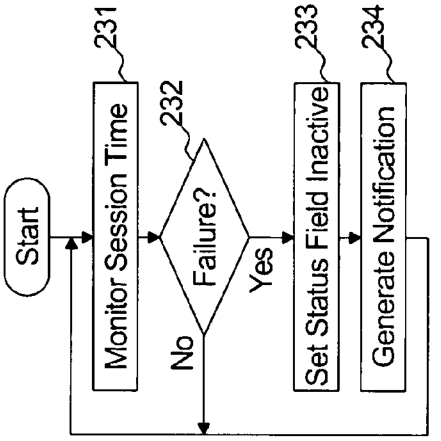
FIG. 28 is a table representing an exemplary heart beat audit table in accordance with one embodiment of the present invention.
FIG. 29 represent an ownership table in accordance with one embodiment of the present invention.
FIG. 30 represents an exemplary session ID monitoring process operated by the transfer server in accordance with one embodiment of the present invention.

Step 421 represents looking up the group ID and user ID which correspond to the Session ID and logging the heart beat in a heart beat audit table 93 as shown in FIG. 28. The heart beat audit table 93 comprises a plurality of records 361, each of which is written in response to receipt of a Heart Beat method call. The fields of each record include the transfer client ID 362 and a time value 366 representative of the time at which the heart beat method call is received. The heart beat audit table 93 is useful for determining when a transfer client 24 has failed to generate a heart beat method call and for enabling administrator review of heart beat method call activity.

Returning to FIG. 15, decision box 422 represents determining whether the web services session has expired. More specifically, if the session has extended beyond the session time 371 as stored in the user ID table 314 (FIG. 5), the session has expired. If the web services session has expired, a response indicating an expired session is returned to the transfer client 24 at step 423. The response may be an XML message encrypted using the symmetrical encryption algorithm and packaged as a SOAP message. To interact with the transfer application 60 after a session has expired, the transfer client 24 must establish a new session by executing a Create Key method call followed by a Log On method call.

If the session has not expired, decision box 424 is reached. Decision box 424 represents determining whether the password has expired. If the password has not been changed for a period of time extending beyond the password time 373 as stored in the user ID table 314 (FIG. 5), the password has expired. If the password is expired a response indicating an expired session is returned to the transfer client 24 at step 425. The response may be an XML message encrypted using the symmetrical encryption algorithm and packaged as a SOAP message. To interact with the transfer application 60 after a password has expired, the transfer client 24 must establish a new password using the Change Password method call discussed with respect to FIG. 16.

If the session has not expired and the password has not expired, decision box 426 is reached. Decision box 426 represents determining whether a new event configuration exists for the transfer client 24. More specifically box 426 represents determining whether the event change field 374 of the record 352 of the user ID table 314 (FIG. 5) associated with the transfer client 24 has been set. As discussed, any update of the transfer client's event configuration by the configuration application 45 will set the event change flag.

If the event configuration for the transfer client 24 has changed, a response indicating changed events is returned to the transfer client at step 427. The response may be an XML message encrypted using the symmetrical encryption algorithm and packaged as a SOAP message. If the event configuration has changed the transfer client 24 will update its local event tables to match the configured events before further interaction with the transfer application 60.

If the session has not expired, the password has not expired, and configured events have not changed, the web services server 46 simply returns an acknowledgement to the Heart Beat method call at step 248. The acknowledgement may be an XML message encrypted using the symmetrical encryption algorithm and packaged as a SOAP message.

Change Password Method

Figure 16:
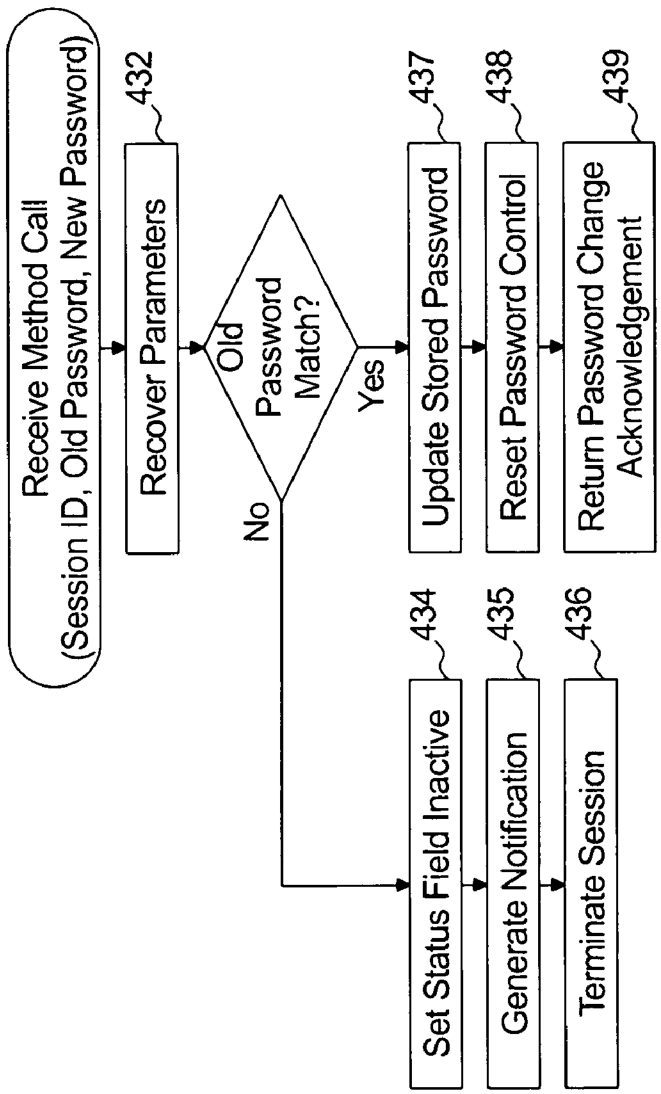

The flow chart of FIG. 16 represents a transfer method 51 called Change Password which is executed by the transfer application 60 in response to receiving a Change Password method call from a transfer client 24. The Change Password method call is an XML message which includes as its parameters: i) the Session ID; ii) the existing password (e.g. old password); iii) a newly generated password (e.g. new password).

Step 432 represents the transfer application 60 using the asymmetric encryption algorithm and TS private to recover the Session ID and the symmetrical encryption algorithm and the Sym Key to decipher the XML method call and recover old password and new password.

Step 433 represents determining whether the old password corresponds to the encrypted password value 82 stored in the User ID table 314, then the encrypted password value 82 stored in the User ID table 314 is updated to an encrypted representation of the new password at step 437.

Step 438 represents resetting the password life value 373 (FIG. 5) such that the new password will expire within a predetermined period of time.

Step 439 represents returning a password change acknowledgement to the transfer client 24. The acknowledgement may be an XML message encrypted using the symmetrical encryption algorithm and packaged as a SOAP message.

If the old password does not match the result of deciphering the encrypted password 82 at decision box 433: i) the status field 369 of the record 352 is set to "Inactive" at step 434; ii) notification is sent to the notification address 79 as stored in the alert instruction field 367 of the record 352 at step 435; and iii) the session is terminated at step 436.

Retrieve Active Event Keys Method

Figure 17:
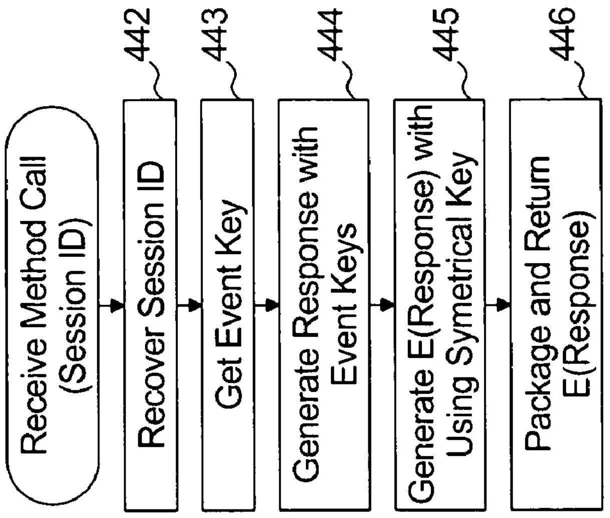

The flow chart of FIG. 17 represents a transfer method 51 called "Retrieve Active Event Keys" which is executed by the transfer application 60 in response to receiving a Retrieve Active Events Keys method call from a transfer client 24. The Retrieve Active Event Keys method call is an XML message which includes the session ID as its parameter.

Step 442 represents the transfer application 60 using the asymmetric encryption algorithm and TS private to recover the Session ID and the symmetrical encryption algorithm and the Sym Key to decipher the XML method call.

Step 444 represents the transfer application 60: i) retrieving the group ID 71 and the user ID 72 associated with the Session ID 83 from the User ID table 314; ii) retrieving each event key 80 associated with the group ID 71 and the user ID 72 in the event key table 311 (FIG. 9*a*); and iii) generating an XML response message that includes the event keys associated with the transfer client 24.

Step 445 represents encrypting the XML response message (including the event keys) using the symmetrical encryption algorithm and step 446 represents packaging the encrypted XML response as a SOAP message and returning such SOAP message to the transfer client 24.

Read Event Method

Figure 18:
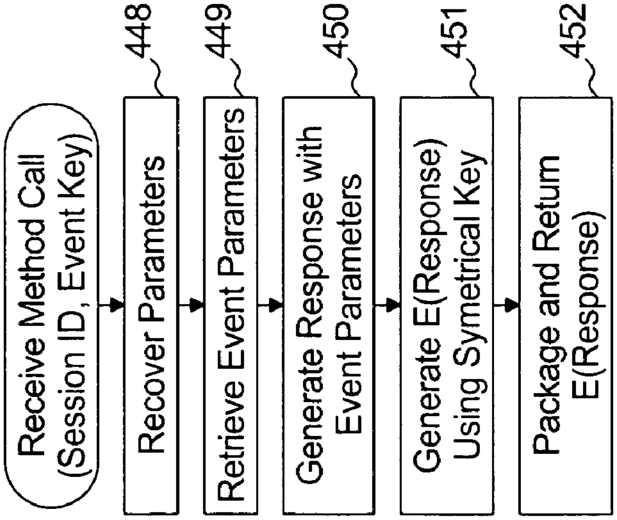

The flow chart of FIG. 18 represents a transfer method 51 called Read Event which is executed by the transfer application 60 in response to receiving a Read Event method call from a transfer client 24. The Read Event method call is an XML message which includes the session ID and an event key as its parameters.

Step 448 represents the transfer application 60 using the asymmetric encryption algorithm and TS private to recover the Session ID and the symmetrical encryption algorithm and the Sym Key to decipher the XML method call and recover the event key.

Step 449 represents retrieving the event parameters (e.g. each parameter ID and its associated parameter value) associated with the event on the event parameter table 312 (FIG. 9*b* or 9*c*).

Step 450 represents generating an XML response message that includes such event parameters, step 451 represents encrypting the XML response message (including the event keys) using the symmetrical encryption algorithm, and step 452 represents packaging the encrypted XML response as a SOAP message and returning such SOAP message to the transfer client 24.

Send Printers Method

Figure 19:
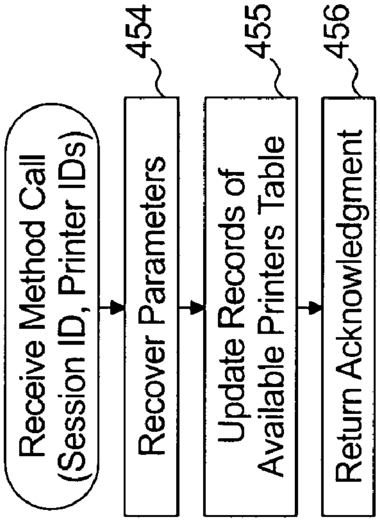

The flow chart of FIG. 19 represents a transfer method 51 called Send Printers which is executed by the transfer application 60 in response to receiving a Send Printers method call from a transfer client 24. The Send Printers method call is an XML message which includes the session ID and the printer ID of each local printer available to the transfer client workstation 22 as its parameters.

Step 454 represents the transfer application 60 using the asymmetric encryption algorithm and TS private to recover the Session ID and the symmetrical encryption algorithm and the Sym Key to decipher the XML method call and recover the printer ID values.

Step 455 represents updating the records 374 of the available printers table 318 to reflect printers then currently available to the transfer client workstation 22.

Step 456 represents returning a printer update acknowledgement to the transfer client 24. The acknowledgement may be an XML message encrypted using the symmetrical encryption algorithm and packaged as a SOAP message.

Update Events Method

Figure 20:
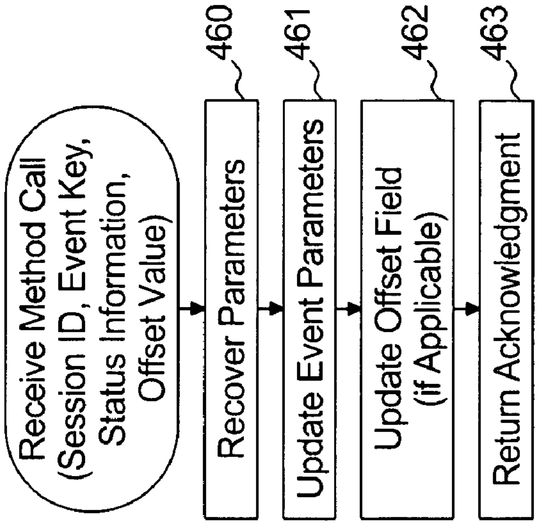

The flow chart of FIG. 20 represents a transfer method 51 called Update Event which is executed by the transfer application 60 in response to receiving a Update Event method call from a transfer client 24. The Update Events method call is an XML message which includes as its parameters: i) the session ID; ii) an event key; iii) status information; and iv) an offset value.

Step 460 represents the transfer application 60 using the asymmetric encryption algorithm and TS private to recover the Session ID and the symmetrical encryption algorithm and the Sym Key to decipher the XML method call and recover the event key, status information, and offset value.

In the exemplary embodiment, the status information may be identification of a parameter ID 321 and a parameter value 422 for storage in the event parameter table 312. It is useful for the transfer client 24 to be able to update parameter values during execution of an event to reflect the processes performed. The offset value is a value representing an increment such that the number of times an event has been processed can be tracked. This is useful for avoiding duplicate upload events or download events for the same file.

Step 461 represents updating the event parameter table 312 as applicable to reflect the status information provided in the Update Event method call.

Step 462 represents updating the offset value as stored in the event parameter table 312 to reflect the Offset Value provided in the Update Event method call.

Step 463 represents returning an event update acknowledgement to the transfer client 24. The acknowledgement may be an XML message encrypted using the symmetrical encryption algorithm and packaged as a SOAP message.

Create Object Method

Figure 21:
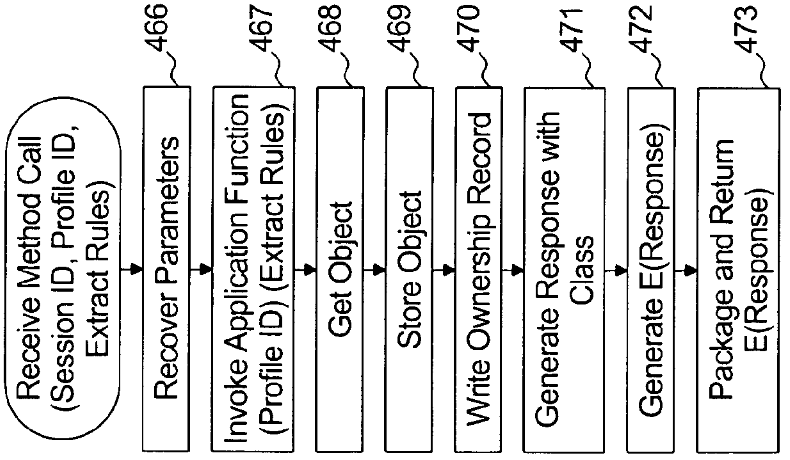

The flow chart of FIG. 21 represents a transfer method 51 called Create Object which is executed by the transfer application 60 in response to receiving a Create Object method call from a transfer client 24. The Create Object method call is an XML message which includes as its parameters: i) the session ID; ii) a profile ID; and iii) extract rules.

Step 466 represents the transfer application 60 using the asymmetric encryption algorithm and TS private to recover the Session ID and the symmetrical encryption algorithm and the Sym Key to decipher the XML method call and recover the profile ID, and extract rules.

Step 467 represents invoking a local data processing function 55 which corresponds to the to the profile ID 347 to retrieve applicable data form the application tables 319 and providing the extract rules 349 to a file building system which formats the retrieved data in a file format compatible with (e.g. for loading into) the business process application 18. For example, in a balance and transaction reporting system, the profile ID 347 may indicate a data processing method and a group of parameters which result in the data processing module retrieving today's balance values for a certain group of accounts from the application tables 319. The extract rules 349 may identify to the file building system that the balances and associated data retrieved from the application tables should be formatted as a particular type of EDI file recognizable by the business process application server 18.

Step 468 represents obtaining the object from the data processing function 55 and step 469 represents writing the object to the object storage 317. Step 470 represents creating an ownership record 63 in an ownership table 62 and populating each of the fields for which a value is available and step 471 represents generating an XML response message which includes a class value.

Turning briefly to FIG. 29, an exemplary ownership table 62 is shown. The ownership table 62 comprises a plurality of records, each of which is associated with a object stored in the object storage 317.

The fields of the ownership table 62 comprise a object ID field 85, a class field 86, a destination group ID field 87, and an offset field 88. The object ID field 85 stores a object ID value 89 which identifies a particular object stored in the object storage 317. The class field 86 stores a class value 90 which identifies the type of data within the object which, in the exemplary embodiment may be a file name extension. The destination group ID field 87 stores a destination group ID 91 which identifies the group ID of a transfer client 24 which may retrieve the object. The offset field 88 stores an offset value 92 which is an increment value assigned to the object and is useful for preventing duplicate downloading of the same object.

Returning to FIG. 21, step 472 represents encrypting the XML response message (including the event keys) using the symmetrical encryption algorithm and step 473 represents packaging the encrypted XML response as a SOAP message and returning such SOAP message to the transfer client 24.

Message Get Method

Figure 22:
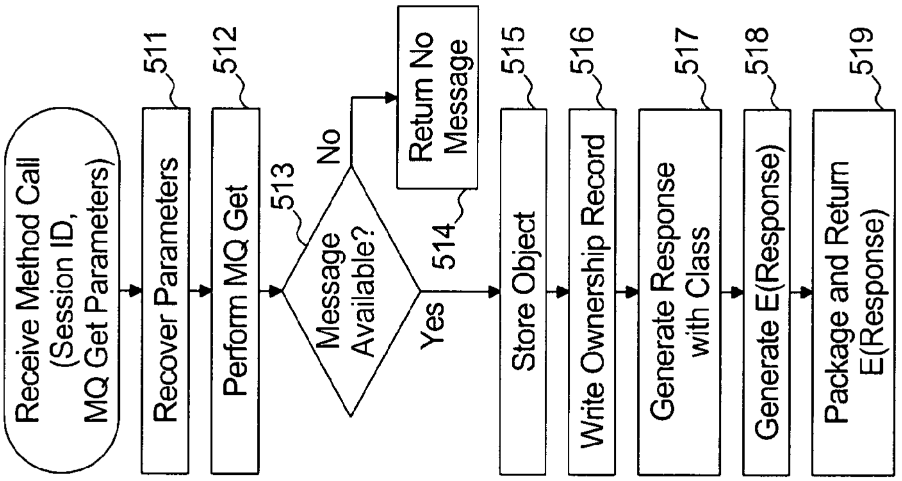

The flow chart of FIG. 22 represents a transfer method 51 called "Message Get" which is executed by the transfer application 60 in response to receiving a "Message Get" method call from a transfer client 24. The "Message Get" method call is an XML message which includes as its parameters: i) the session ID; and ii) MQGET parameters.

Step 511 represents the transfer application 60 using the asymmetric encryption algorithm and TS private to recover the Session ID and the symmetrical encryption algorithm and the Sym Key to decipher the XML method call and recover the MQGET parameters.

Step 512 represents executing an MQGET processing call to the TS message queuing manager 47 in accordance with the MQGET parameters to obtain a message queued for delivery. The MQGET parameters may include a queue definition which indicates a particular queue of the TS message queuing manager 47 in which a message is available for retrieval by the transfer application 60.

If, at step 513, a message is not available in the queue, a no message indication is returned to the transfer client 24 at step 514. If a message is available, it is written to the object storage 317 at step 515.

Step 516 represents creating an ownership record 63 in an ownership table 62 and populating each of the fields for which a value is available as discussed with respect to step 470 of FIG. 21. Step 517 represents generating an XML response message which includes the class value.

Step 518 represents encrypting the XML response message (including the event keys) using the symmetrical encryption algorithm. Step 519 represents packaging the encrypted XML response as a SOAP message and returning such SOAP message to the transfer client 24.

Check For Available Object (CFAO) Method

Figure 23:
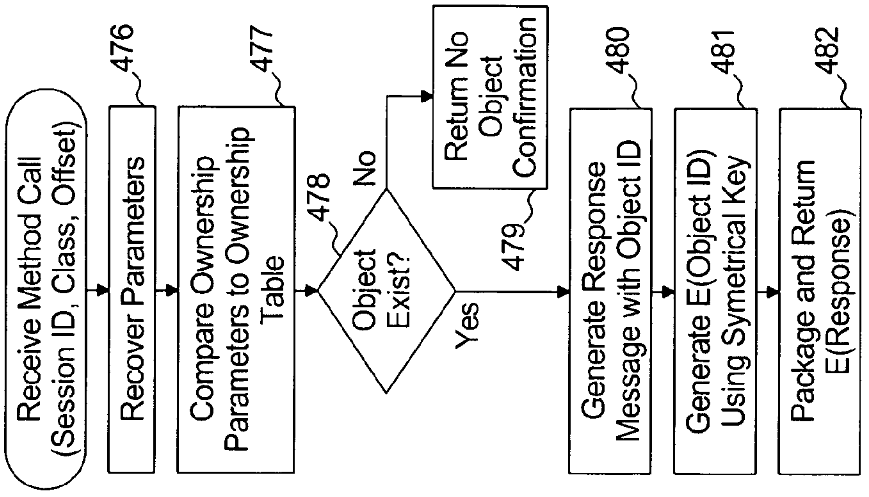

The flow chart of FIG. 23 represents a transfer method 51 called CFAO which is executed by the transfer application 60 in response to receiving a CFAO method call from a transfer client 24. The CFAO method call is an XML message which includes as its parameters: i) the session ID; ii) class; and iii) offset.

Step 476 represents the transfer application 60 using the asymmetric encryption algorithm and TS private to recover the Session ID and the symmetrical encryption algorithm and the Sym Key to decipher the XML method call and recover the class, and offset.

Step 477 represents comparing ownership parameters to values within the ownership table 62 (FIG. 29) to determine whether a object exists for download. More specifically, i) the class value 90 provided in the method call is compared to the class value 90 of each record 63 of the ownership table 62 to determine if an object with a class value matching the class value provided in the method call exists; and ii) the group ID 71 (which associates with the session ID value 83 in the user ID table 314) is compared to the destination group ID 91 of each record 63 of the ownership table 62 to determine if a object with a destination group ID 91 matching the group ID 71 of the transfer client 24 exists.

In either case, the offset value 92 provided in the method call is compared to the offset value 92 in the ownership table 62. An offset value 92 in the ownership table 62 that is higher than the offset value 92 provided in the method call indicates that the object has not yet been downloaded and therefore exists for download.

If a object exists for download as determined at decision box 478, an XML response message which includes the object ID 89 from the record 63 is generated at step 480. The XML response message is encrypted using the symmetrical encryption algorithm at step 481, and, at step 482, the encrypted response message is packaged as a SOAP message and returned to the transfer client 24.

Alternatively, if no object meeting the ownership requirements exists at decision box 478, a “no-object” confirmation is returned to the transfer client 24 at step 496. The no-object acknowledgement may be an XML message encrypted using the symmetrical encryption algorithm and packaged as a SOAP message.

Download object Method

Figure 24:
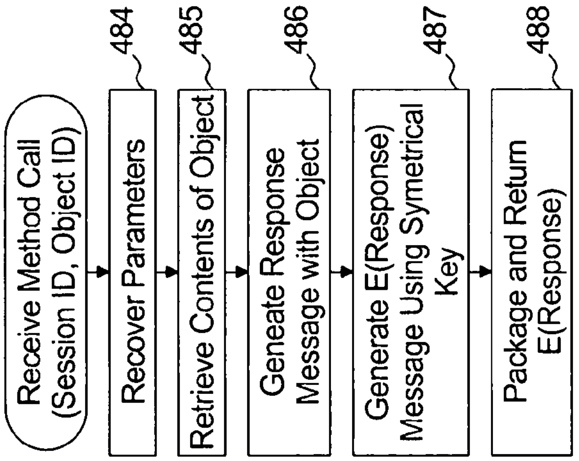

The flow chart of FIG. 24 represents a transfer method 51 called Download Object which is executed by the transfer application 60 in response to receiving a Download Object method call from a transfer client 24. The Download object method call is an XML message which includes the Session ID and a object ID as its parameters.

Step 484 represents the transfer application 60 using the asymmetric encryption algorithm and TS private to recover the Session ID and the symmetrical encryption algorithm and the Sym Key to decipher the XML method call and recover the object ID.

Step 485 represents retrieving the object corresponding to the object ID 89 from the object storage 317 and step 486 represents packaging the object within an XML message for return to the transfer client 24. The XML response message is encrypted using the predetermined symmetrical encryption algorithm at step 487, and, at step 488, the encrypted response message is packaged as a SOAP message and returned to the transfer client 24.

Upload File Method

Figure 25:
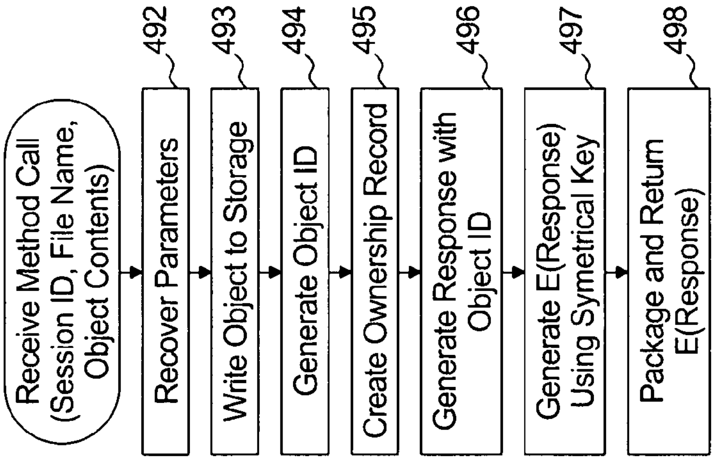

The flow chart of FIG. 25 represents a transfer method 51 called Upload Object which is executed by the transfer application 60 in response to receiving an Upload Object method call from a transfer client 24. The Upload Object method call is an XML message which includes as its parameters: i) the session ID; ii) file name; and iii) binary object contents.

Step 492 represents the transfer application 60 using the asymmetric encryption algorithm and TS private to recover the Session ID and the symmetrical encryption algorithm and the Sym Key to decipher the XML method call and recover the file name and object contents.

Step 493 represents writing the object contents to the object storage 317, step 494 represents generating a object ID to associate with the object contents, and step 495 represents creating and populating an ownership record 63 in the ownership table 62 (FIG. 29).

Step 496 represents generating an XML response message which includes the object ID, 497 represents encrypting the XML response message (including the event keys) using the symmetrical encryption algorithm, and step 498 represents packaging the encrypted XML response as a SOAP message and returning such SOAP message to the transfer client 24.

Set Destination ID

Figure 26:
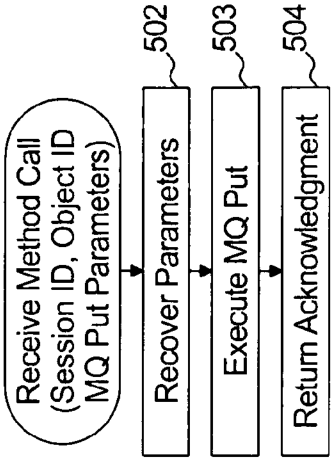

The flow chart of FIG. 26 represents a transfer method 51 called Set Destination ID which is executed by the transfer application 60 in response to receiving a Set Destination ID method call from a transfer client 24. The Set Destination ID method call is an XML message which includes as its parameters: i) the session ID; ii) object ID; and iii) MQPUT parameters.

Step 502 represents the transfer application 60 using the asymmetric encryption algorithm and TS private to recover the Session ID and the symmetrical encryption algorithm and the Sym Key to decipher the XML method call and recover the object ID and the MQPUT parameters.

Step 503 represents executing an MQPUT processing call to the TS message queuing manager 47 in accordance with the MQPUT parameters to effect delivery of the uploaded file to its intended destination.

Step 504 represents returning an acknowledgement to the transfer client 24. The acknowledgement may be an XML message encrypted using the symmetrical encryption algorithm and packaged as a SOAP message.

Process Object Method

Figure 27:
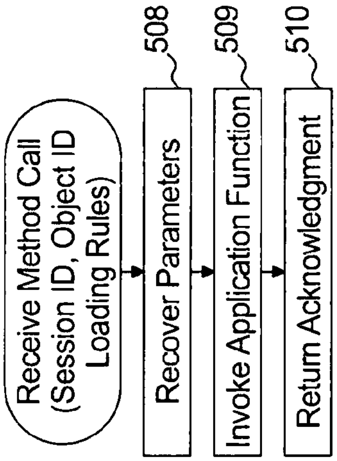

The flow chart of FIG. 27 represents a transfer method 51 called Process Object which is executed by the transfer application 60 in response to receiving a Process Object method call from a transfer client 24. The Process Object method call is an XML message which includes as its parameters: i) the session ID; ii) object ID; and iii) loading rules.

Step 508 represents the transfer application 60 using the asymmetric encryption algorithm and TS private to recover the Session ID and the symmetrical encryption algorithm and the Sym Key to decipher the XML method call and recover the object ID and loading rules.

Step 509 represents invoking data processing functions 55 for loading the contents of the object into the application tables 319 in accordance with the loading rules. Both identification of the application function and the loading rules are as set forth in the event parameter table 312 and are provided by the transfer client 24 as part of the method call.

Step 510 represents returning an acknowledgement to the transfer client 24. The acknowledgement may be an XML message encrypted using the symmetrical encryption algorithm and packaged as a SOAP message.

Web Services Server Monitoring of Polling

In addition to providing the methods discusses with respect to FIGS. 13 through 27, the transfer server 60 also includes a session monitoring process 53 for monitoring the Heart Beat method calls of each transfer client 24 and, if a transfer server fails to periodically contact the transfer application 60 to update its password and events, the transfer application 60 can deactivate the transfer client 24 and generate a heart beat failure alert.

Referring to FIG. 30, the session monitoring process 53 monitors the heart beat audit table 93 (FIG. 28), as represented by step 231, and in the event that the current time exceeds the most recent time stamp value stored in the session time field 366 and associated with the transfer client 24 by more than the time interval 78 (stored in the interval field 364 of the record 352 associated with the transfer client 24 in the user ID table 314 of FIG. 5), the transfer client 24 has failed to generate a required heart beat method call within the proper time interval. Determining that such failure exists is represented by decision box 232.

In response to such failure: i) the status field 369 of the record 352 (FIG. 5) is set to "Inactive" at step 233; and ii) notification is sent to the notification address 79 as stored in the alert instruction field 367 of the record 352 at step 234.

Transfer Client

As discussed, the transfer client 24 opens a secure web services session with the transfer application 60 and makes method calls thereto to: i) obtain an indication of events configured by an administrator; and ii) execute such events. All method calls are XML messages (compliant with the web services server WSDL document) within simple object access protocol (SOAP) packages.

In the aggregate, the method calls provide for the transfer client 24 to: i) open a web services session and configure the Sym Key with the transfer application 60 for use during the session; ii) authenticate itself to the transfer application 60 utilizing the authentication credentials 70; and iii) obtain a Session ID from the transfer application 60 for use with subsequent method calls. The subsequent method calls enable the transfer client 24 to: i) provide the transfer application 60 with a list of printers which are available to the transfer client workstation 23 (so that an administer may configure downloaded files for automated printing); ii) obtain parameters for upload events and download events scheduled for the transfer client 24 (as configured by an administrator during an HTTPS session between a browser 28 and the configuration application 45); and iii) execute each of such scheduled upload events and download events.

As discussed, execution of an upload event comprises executing an MQGET processing call to the TC message queuing manager 50 to obtain a message object, uploading the object, and: i) invoking a data processing function 55 to handle the object; or ii) making a Set Destination Object ID method call to initiate delivery of the object to a remote system.

In general, execution of a download event comprises generating an XML processing call instructing the transfer application 60 to: i) invoke a data processing function 55 for extracting data from the application tables 319 and creating an object for download; or ii) execute an MQGET to the TS message queuing manager 47 to obtain an object for download—and: i) generating XML processing call(s) to the transfer application 60 to check if a file with applicable ownership information is available for download; ii) generating XML processing call(s) to the transfer application 60 to obtain the object as payload of an XML message; and iii) executing an MQPUT to the TC message queuing manager 50 to initiate delivery to the business process application 18.

Figure 39:
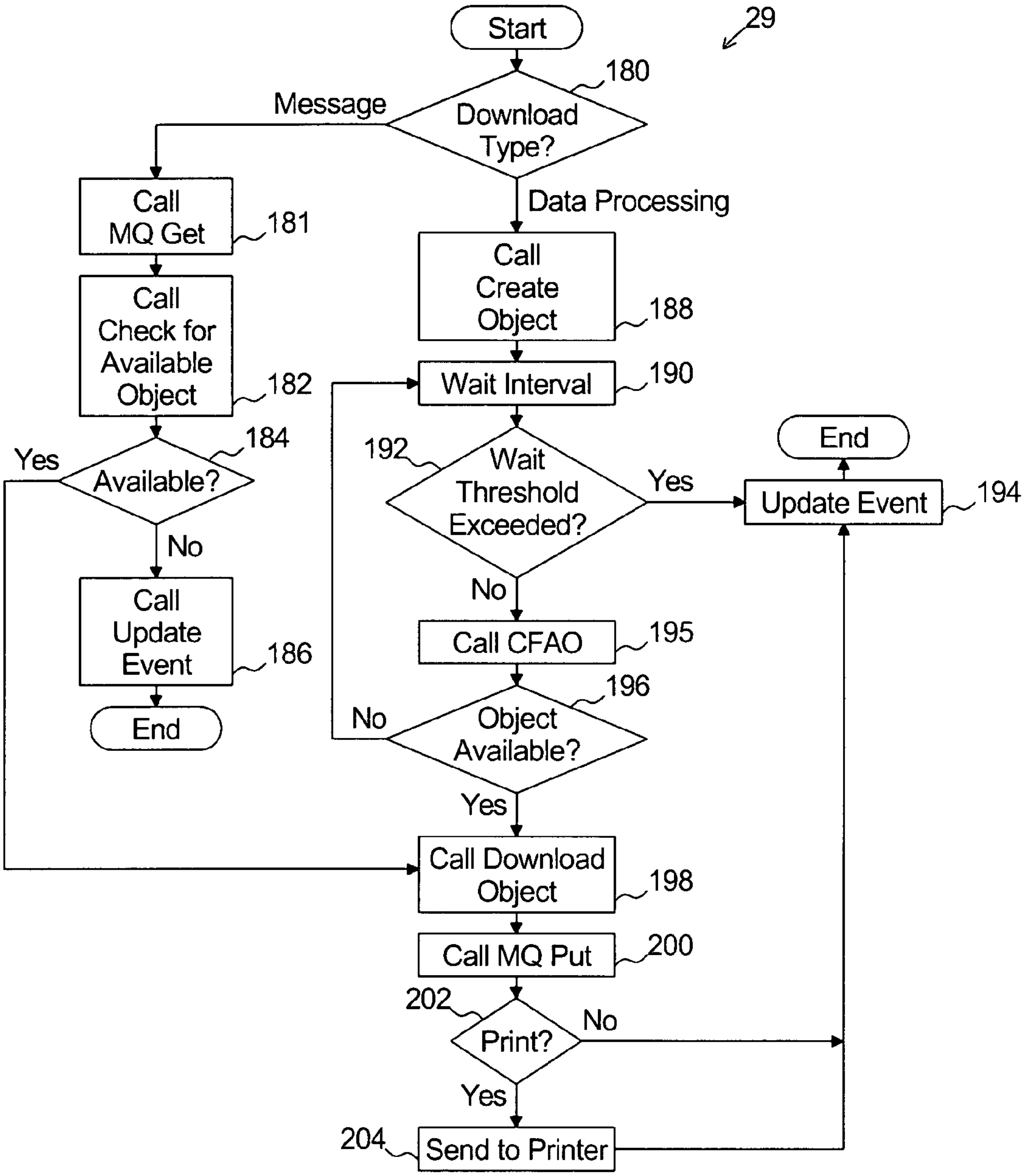
FIG. 39 is a flow chart representing an exemplary download process in accordance with one embodiment of the present invention.

To perform these functions, the transfer client 24 may include a core process 25 (FIG. 32), local processes 23 (FIG. 31), spawned upload processes 27 (FIG. 40) and spawned download processes 29 (FIG. 39).

In general, the core process 25 directs operation of the transfer client 24 and, more specifically, provides for the transfer client 24 to periodically generate a heart beat method call to the transfer application 60 and when appropriate: i) initiate a web services session and obtain a session ID from the transfer application 60, ii) update its password value 73; iii) update the available printers table 318; and iv) obtain event parameters for upload and download events. Each of the spawned upload processes 27 and download processes 29 is built by the transfer client 24 utilizing event parameters received from the transfer application 60 for the purposes of executing the upload event or download event respectively. Each of the core process 25 and the spawned processes 27 and 29 make calls to local processes 23 for performing applicable functions.

Figure 32:
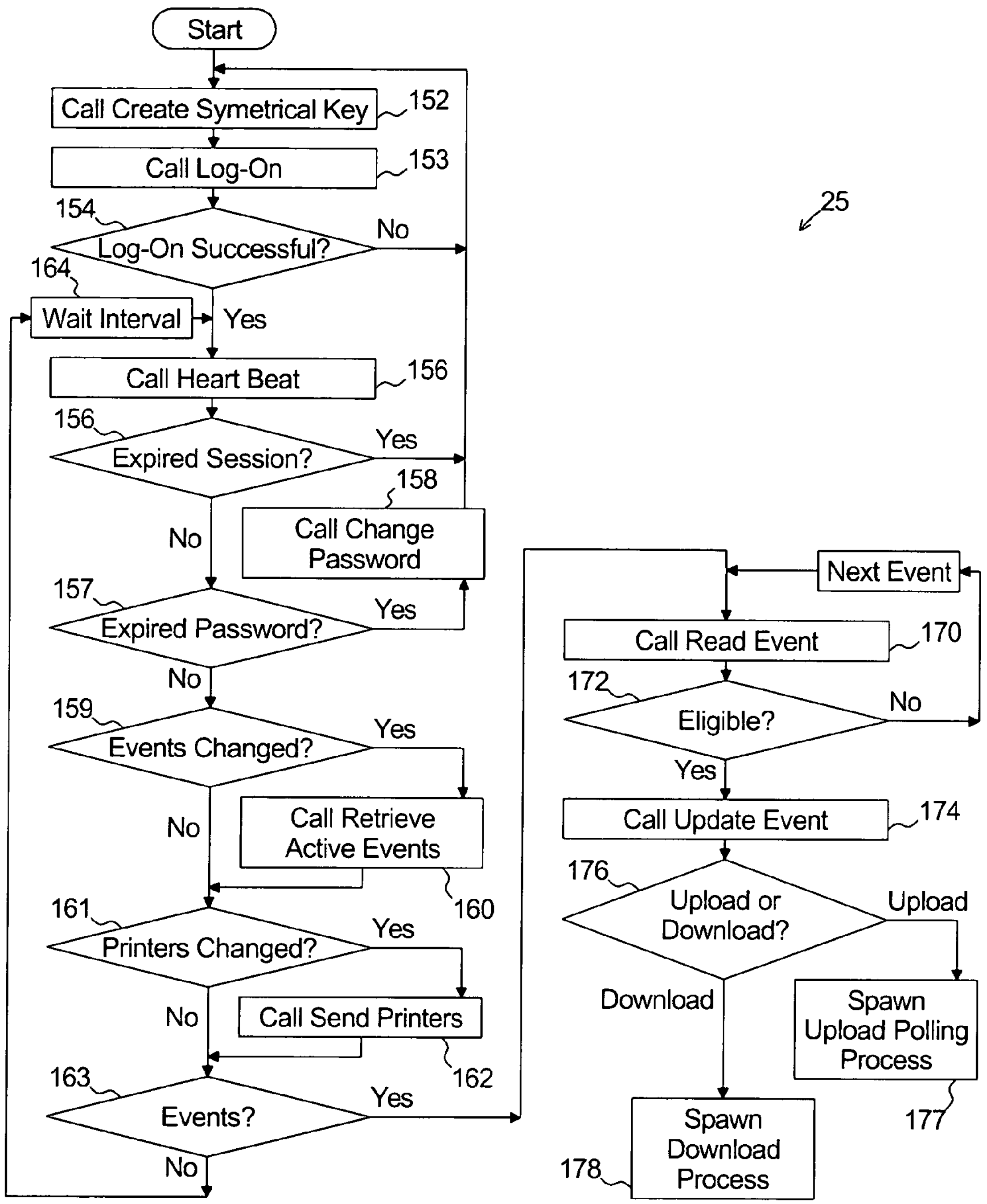
FIG. 32 is a flow chart representing exemplary core process of a transfer client in accordance with one embodiment of the present invention.

The flow chart of FIG. 32 represents exemplary operation of the core process 25. The core process 25 begins running upon installing the transfer client 24 onto the workstation 22.

Step 152 represents the transfer client application 24 executing a local process 23 called create key. The create key local process generates a method call to the Create Key transfer method 51 operated by the transfer application 60.

Figure 33:
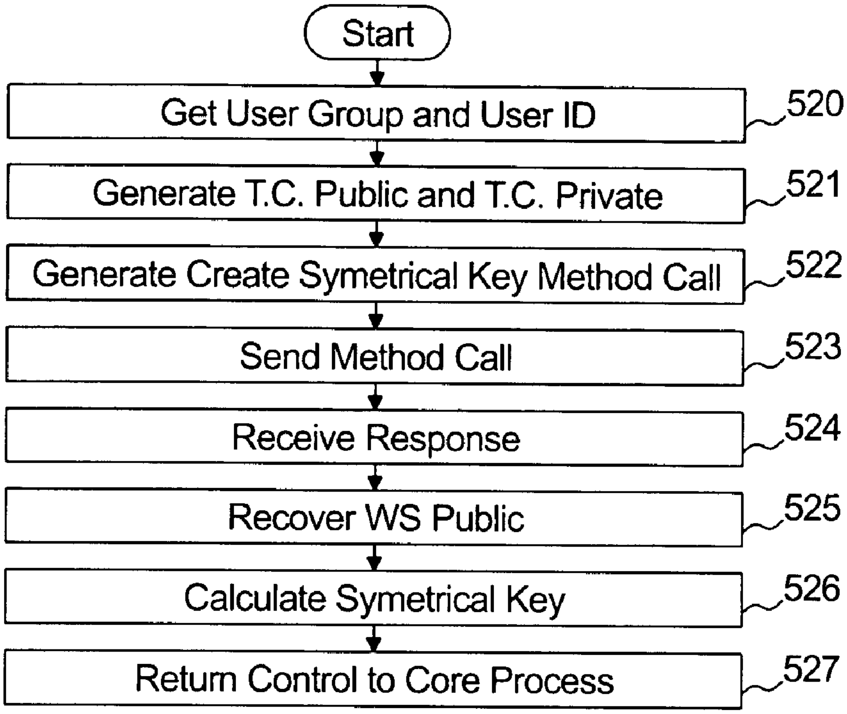
FIG. 33 through 38 are flow charts representing exemplary local processes of a transfer client in accordance with one embodiment of the present invention.

Turning briefly to the flow chart of FIG. 33, exemplary processing steps of the create key local process are shown. Step 520 represents the local process obtaining the user group 71 and the user ID 72 from volatile memory. The user group 71 and the user ID 72 are required parameters for the method call to the Create Key transfer method 51.

Step 521 represents the local process generating a public/private key pair (e.g TC Public and TC Private) for use with an asymmetric encryption algorithm and calculating Sym Key. As discussed, TC Private is a random integer value and TC public is calculated from TC Private, the predetermined generator value and the predetermined large prime number. TC Public is a required parameter for the method call to the Create Key transfer method 51.

Step 522 represents embodying the parameters within an XML method call to the Create Key transfer method 51, step 523 represents sending the method call to the transfer application 60, and step 524 represents receiving a response back from the transfer application 60.

As discussed with respect to FIG. 13, the response will be an XML response message (that includes WS Public) encrypted using the asymmetric encryption algorithm and TC Public as the encryption key. Step 525 represents using the asymmetric encryption algorithm and TC Private to recover WS public from the response message.

Step 526 represents using WS Public and TC Private to calculate the Sym Key and step 527 represents returning control to the core process 25.

Returning to FIG. 32, Step 153 represents the transfer client application 24 executing a local process 23 called log-on. The log-on local process generates a method call to the Log-On transfer method 51 operated by the transfer application 60.

Figure 34:
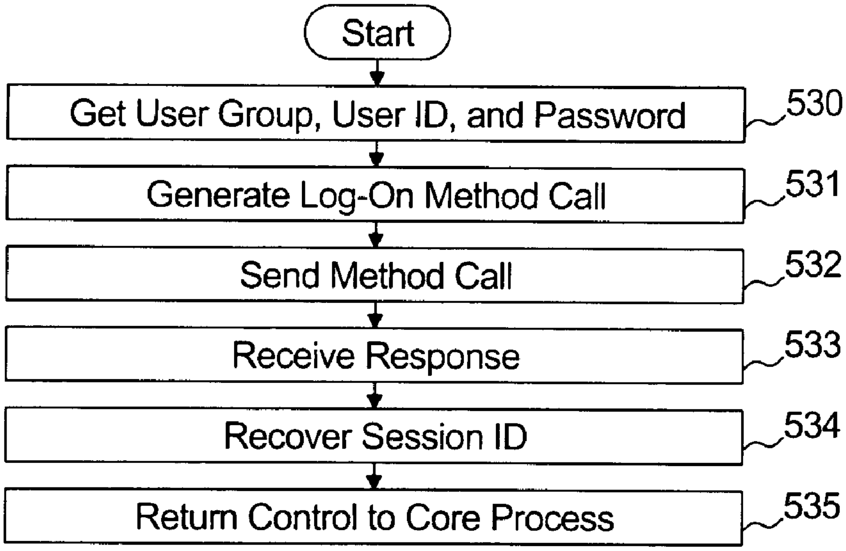

Turning briefly to the flow chart of FIG. 34, exemplary processing steps of the log-on key local process are shown. Step 530 represents the local process obtaining the user group 71, the user ID 72, and the password 73 from memory.

Step 531 represents embodying the parameters within an XML method call to the Log-On transfer method 51, step 532 represents sending the method call to the transfer application 60, and step 533 represents receiving a response back from the transfer application 60.

As discussed with respect to FIG. 14, the response will be an XML response message (that includes the Session ID) encrypted using the symmetric encryption algorithm. Step

534 represents using the symmetric encryption algorithm and Sym Key to recover the Session ID from the response message and step 535 represents returning control to the core process 25.

Returning to the flow chart of FIG. 32, if the logon is successful, as determined at step 154, a first of a plurality of periodic heart beat method calls to the transfer application 60 is performed. More specifically, step 155 represents the transfer client application 24 executing a local process 23 called heart beat. The heart beat local process generates a method call to the Heart Beat transfer method 51 operated by the transfer application 60.

Figure 35:
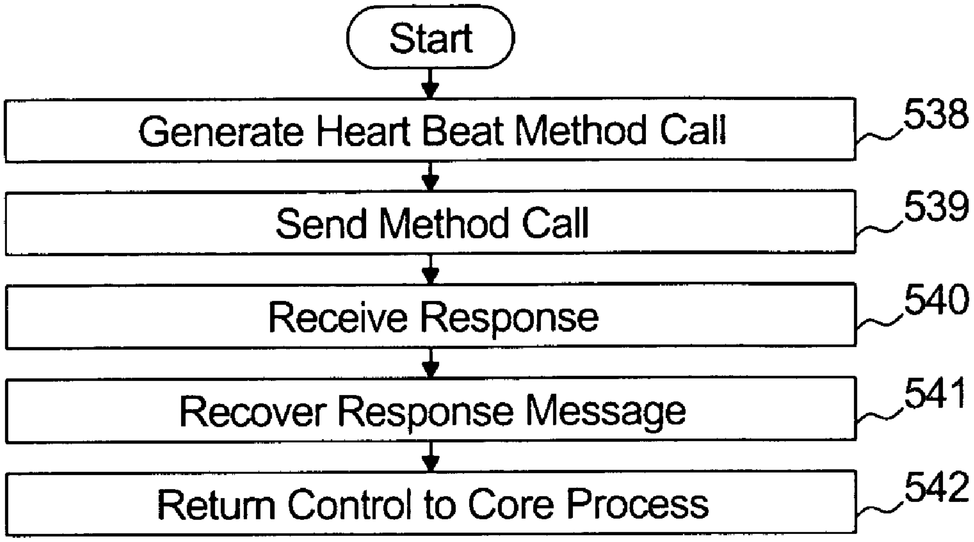

Turning briefly to the flow chart of FIG. 35, exemplary processing steps of the heart beat local process are shown. Step 538 represents embodying the session ID within an XML method call to the Heart Beat transfer method 51, step 539 represents sending the method call to the transfer application 60, and step 540 represents receiving a response back from the transfer application 60.

As discussed with respect to FIG. 15, the response will be an XML response message encrypted using the symmetric encryption algorithm. Step 541 represents using the symmetric encryption algorithm and Sym Key to recover the response message and step 542 represents returning control to the core process 25.

As discussed with respect to FIG. 15, the response to the Heart Beat method call can be any of: i) an expired session response; ii) an expired password response; iii) an events changed response; or iv) a heart beat acknowledgement.

Returning to FIG. 32, if at step 156, the response is an expired session response, the core process returns to step 152 wherein the create symmetrical key local function is again performed.

If the session has not expired as determined at step 156 and if, at step 157, the response is an expired password response, a local process called change password is executed at step 158. The change password local process makes a method call to the Change Password transfer method 51 operated by the transfer application 60.

Figure 36:
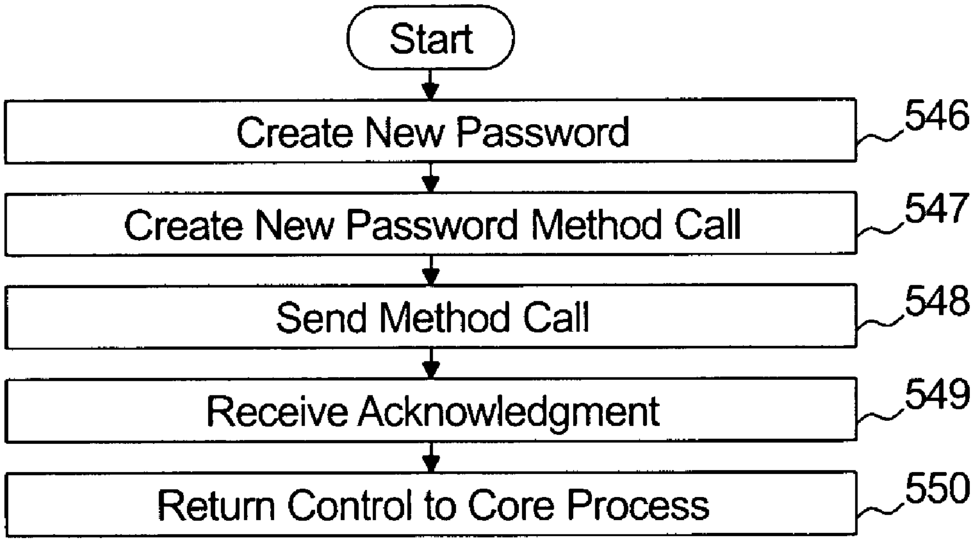

Turning briefly to FIG. 36, exemplary steps representing the change password local process are shown. Step 546 represents generating a new password and step 547 represents embodying the session ID, the old password, and the new password within an XML method call to the Change Password transfer method 51, step 548 represents sending the method call to the transfer application 60, step 549 represents receiving the change password acknowledgement back from the transfer application 60; and step 550 represents returning control to the core process 25.

Returning again to FIG. 32, after the password has been updated in accordance with step 158, the core process returns to step 152 wherein the create key local function is again performed.

If neither the session is expired (as determined at step 156), nor the password expired (as determined at step 157), it is determined at step 159 whether the response to the Heart Beat method call is an events changed response. If yes, a local process called retrieve active event keys is executed at step 160. The local process makes a method call to the Retrieve Active Event Keys transfer method 51 operated by the transfer application 60.

Figure 37:
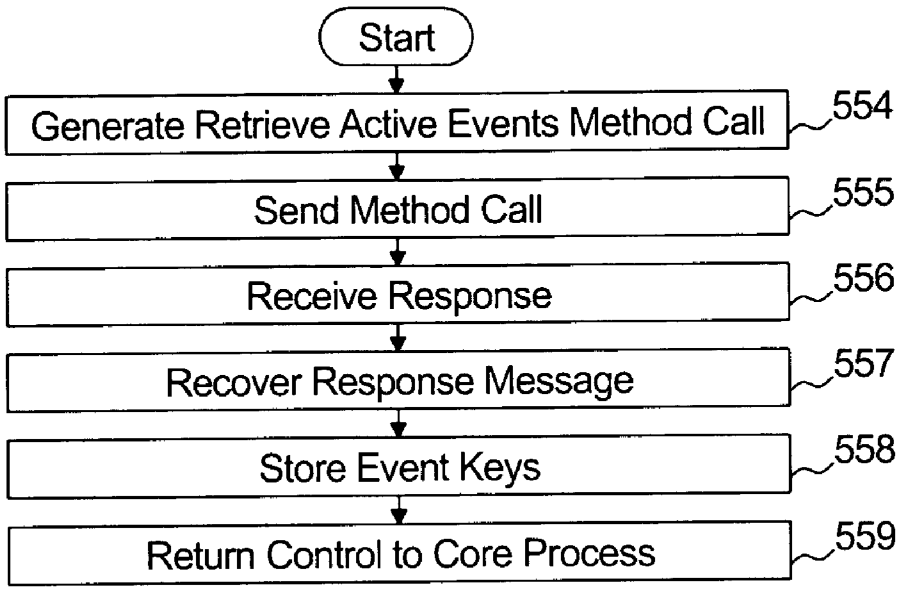
Figure 38:
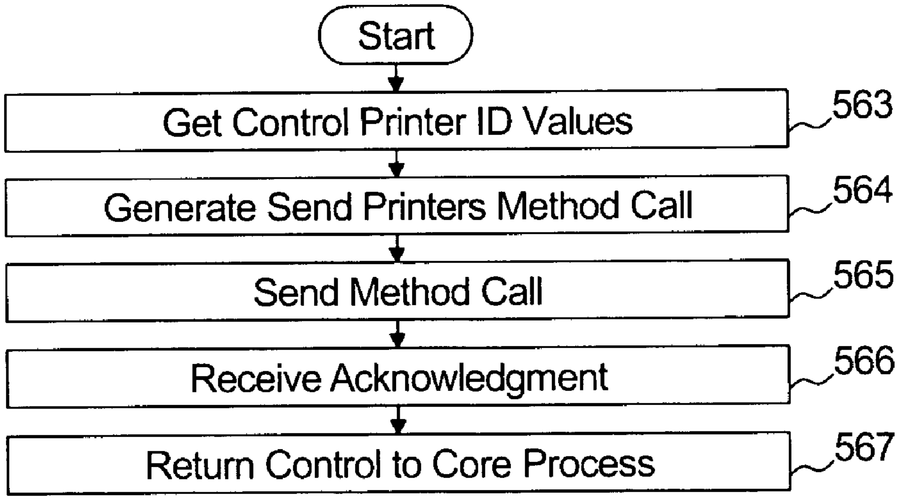

Turning briefly to FIG. 37, step 554 represents embodying the session ID within an XML method call to the Retrieve Active Event Keys transfer method 51, step 555 represents sending the method call to the transfer application 60, and step 556 represents receiving a response back from the transfer application 60.

As discussed with respect to FIG. 17, the response will be an XML message which includes active event keys associated with the transfer client 24 and is encrypted using the symmetric encryption algorithm. Step 557 represents using the symmetric encryption algorithm to recover the active event keys within the response message; step 558 represents writing the event keys to local memory, and step 559 represents returning control to the core process 25.

Returning to the flow chart of FIG. 32, after event keys are obtained at step 160 (or if step 160 is not performed because of no event changes), it is determined at step 161 whether a list of locally available printers has changed.

If the list of locally available printers has changed, a local process called send printers is executed at step 162. The local process makes a method call to the Send Printers transfer method operated by the transfer application 60.

Turning briefly to FIG. 18, step 562 represents retrieving the list of available local printers from the operating system. Step 563 represents embodying a list of printer IDs representing the available printers along with the session ID within an XML method call to the Send Printers transfer method, step 564 represents sending the method call to the transfer application 60, step 565 represents receiving an acknowledgement back from the transfer application 60, and step 566 represents returning control to the core process 25.

Returning again to FIG. 32, after printer IDs are sent to the transfer application 60 at step 162 (or if printer IDs are not sent because of no printer changes as determined at step 161), it is determined at step 163 whether one or more events require execution. If no events require execution, the transfer client 24 waits the time interval 78 (FIG. 5) before again making a method call to the Heart Beat transfer method at step 155.

If one or more events require execution, each event is performed in sequence. Execution of an event requires first making a processing call to the local read event process (step 170) which in turn makes a method call to the Read Event transfer method 51 operated by the transfer application 60.

The local process provides the Session ID 83 and the event key 80 as parameters of the XML method call. In response, the transfer application 60 executes its Read Event method as discussed with respect to FIG. 18 and returns a response XML message (encrypted using the symmetrical encryption algorithm). The XML message includes all of the parameters associated with the event key 80 in the event parameter table 312 (FIG. 9*b* or 9*c*)—with the parameter ID 321 being the XML tag and the parameter value 322 being associated with the tag.

Decision box 172 represents determining whether the event associated with the event key 80 is eligible to run. For example, parameters of the event parameter table 312 may identify certain time periods or certain frequencies that events may be ran. If the event is outside of such time period or frequency parameters, the event is considered ineligible to run. If not eligible, the next event key 80 is selected and the local process 23 Read Event is executed for such next event key 80 at step 170.

Step 174 represents executing a local process 23 called update event. Update Event makes a method call to the Update Event transfer method operated by the transfer application 60. The local function provides the Session ID 83, event key value 80, status information (such as the time the event was started, the time the event was completed, or the time the event was aborted), and an offset value as parameters of the method call. The purpose of this Update Event processing call is to update applicable fields in the event parameter table 312 to indicate the then current status of the event. In response, the transfer application 60 will execute its Update Event Method as discussed with respect to FIG. 20 for purposes of updating the applicable status records of the event parameters table 312.

The event associated with the event key 80 may be any of a download event or an upload event. The type of event is identified by a parameter value returned at step 170. Step 176 represents determining whether the event is an upload event or a download event. If the event is an upload event, an upload polling process 27 is spawned at step 177. If the event is a download event, a download process 29 is spawned at steps 178.

Spawning Download Process

The flow chart of FIG. 39 represents exemplary operation of a spawned download process 29.

Step 180 represents determining the type of the download event. The download event may be either a message event or a data processing event. The type of event is identified by the event type parameter 344 from the event parameter table 312 and received at step 170.

If the event type is messaging, step 181 is performed. Step 181 represents executing a local function called MQGET. The local function makes a method call to the MQGET transfer method operated by the transfer application 60.

In response, the transfer application 60 executes an MQGET processing call to the TS message queuing manager 47 to obtain an object queued for delivery in a queue identified in the MGQET processing call (e.g. the queue identified by the download event parameters in the event parameters table 312, obtained by the transfer client 24, and passed to the transfer application 60 as part of the MQGET method call) and stores the object for download as previously discussed with respect to FIG. 22.

Following the MQGET processing call, the transfer client 24 executes a local process 23 called "Check For Available Object". The local function makes a method call to the "CFAO" transfer method operated by the transfer application 60. The local process provides the Session ID 83, a class value 90, and offset value 92 as parameters of the method call. In response, the transfer application 60 executes its "CFAO" method as discussed with respect to FIG. 23 and, if an object is available for download, returns an object ID 89.

If no object is available, as determined at decision box 184, the transfer client 24 again executes the local process 23 called "Update Event" at step 186—for the purpose writing an indication that the event is complete to applicable records of the event parameter table 312.

Following execution of "Update Event", the process again returns control to the core process at step 170 where the function Read Event is executed for the next Event Key value 80.

If an object is available at decision box 184, the transfer client 24 executes a local process 23 called "Download Object". The local process 23 makes a method call to the "Download Object" transfer method operated by the transfer application 60. The local function provides the Session ID 83 and object ID 89 as parameters of the method call. In response, the transfer application 60 executes its Download Object Method as discussed with respect to FIG. 23 and returns the contents of the object associated with the object ID 89.

Step 200 represents the transfer client 24 executing a local process 23 called "MQPUT Local" MQPUT Local is a function that makes a processing call to the TC message queuing manager 50 specifying a local definition of a queue to which the object is to be queued for delivery. The parameters for the MQPUT Local processing call are identified by the MQPUT Local destination definition parameter 343 associated with the event in the event parameter table 312 and provided to the transfer client in response to the Read Event method call at step 170.

Step 202 represents determining whether the object is a file that is to be queued for automatic printing. The event parameters received at step 170 may include an indication that the file should be automatically printed (e.g. print code 354) and an indication of one of the available printers (e.g. printer 352). If yes at step 202, the transfer client 24 executes a local function called "Send To Printer" at step 204. The local function retrieves the printer ID from the parameters provided at step 170 and queues the file for the printer.

Following execution of "Send to Printer", or upon determining that the object is not to be sent to a printer, Update Event is again called at step 194.

Returning to decision box 180, if the download type is a data processing download, the transfer client 24 executes a local process 23 called "Create Object". The local process makes a method call to a transfer method 51 operated by the transfer application 60 called "Create Object". The local process provides the Session ID 83, Profile ID 347, and extract rules 349 as parameters of the method call. In response the transfer application 60 will execute its "Create Object" method as discussed with respect to FIG. 21.

Following the "Create Object" method call, the transfer client 24 waits a time interval, at step 192, while the transfer application 60 executes its Create Object Method. If at decision box 192, the total time elapsed since the "Create Object" method call was made exceeds a threshold, the transfer client 24 effectively aborts the download and proceeds to step 194 where the Update Event function is executed to write an indication that the event was aborted to the applicable status records of the event parameters table 312.

If at decision box 192 the total time elapsed since the "Create Object" method call was made had not exceeded the threshold, the transfer client 24 executes the local "Check For Available Object" function at step 195 (as previously discussed with respect to Step 182). In response, the transfer application 60 returns an object ID if a object meeting the criteria is available for download. Presumably the object was created in response to the "Create Object" method call and is now available.

If no object is available, as determined at decision box 196, the transfer client 24 returns to step 190 to again wait for a predetermined time interval.

If an object is available at decision box 196, the transfer client 24 executes the local "Download Object" function at step 198 as previously discussed.

Spawned Upload Process

Figure 40:
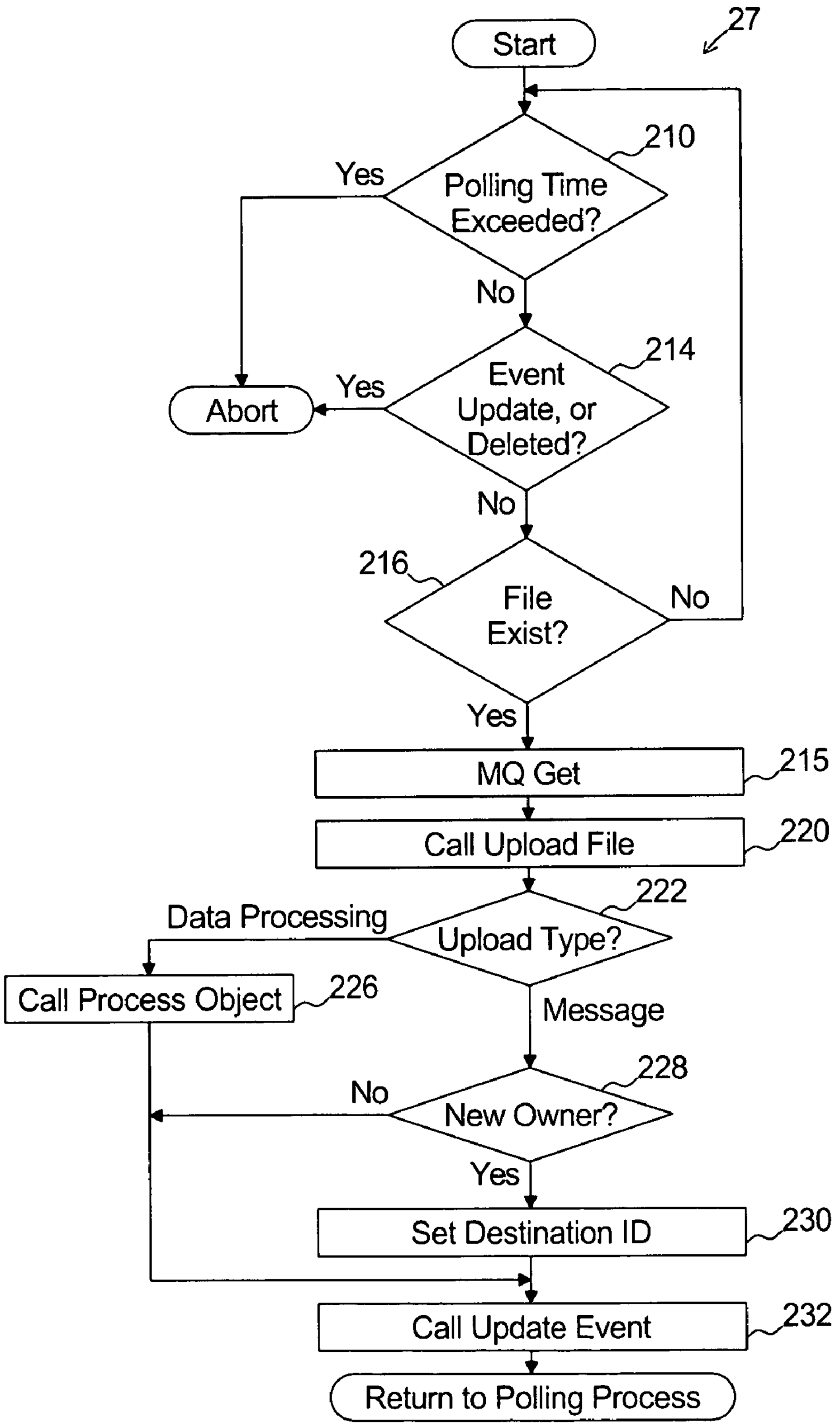
FIG. 40 is a flow chart representing an exemplary upload process in accordance with one embodiment of the present invention.

The flow chart of FIG. 40 represents steps of a spawned upload process 27. In the exemplary embodiment, the upload process 27 will periodically call a local function called MQGet Local which makes an MQGET processing calls to the TC message queuing manager 50 (specifying a queue definition) and, when an object is obtained from the TC message queuing manager 50, proceed to steps which upload the object to the transfer application 60.

Decision box 210 represents determining whether a polling time threshold has been exceeded. The spawned upload process 27 will only make the MQGET processing calls for a limited period of time referred to as the polling time threshold. If this has been exceeded, the process is aborted.

If the polling time threshold has not been exceeded at decision box 210, the polling process determines whether the event has been updated or deleted at step 214. Determining whether the event has been updated or deleted may include making another Read Event method call to the transfer application 60 to determine whether event parameters have been changed or the event deleted. If the event has been updated or deleted, the process is aborted. The event, to the extent updated, is processed as a "new" event beginning with step 172 of the flow chart of FIG. 32.

If the event has not been updated or deleted, the process makes the MQ GET processing call to the TC message queuing manager 50 at step 215. At step 216, it is determined whether an object has been obtained from the TC message queuing manager 50 at decision box 216. If an object is not returned, the polling process again returns to decision box 210 to determine whether the polling time threshold has been exceeded.

If an object is returned, the transfer client 24, at step 220 calls a local process 23 called "Upload File" which makes a method call to a transfer method 51 operated by the transfer application 60 called "Upload File". The local process provides the Session ID 83 and File Name as parameters of the method call. In response, the transfer application 60 executes its "Upload File" method as discussed with respect to FIG. 25 to obtain the object, store the object in object storage 317 and create an applicable record in the ownership table 62. The class value 90 is derived from the file name included in the "Upload File" method call.

Decision box 222 represents determining the upload file type—which is indicated in an object handling parameter 326 provided at step 170. If the upload file type is data processing, step 226 represents the execution of a local process 23 called "Process Object" which makes a method call to a transfer method 51 operated by the transfer application 60 called "Process Object". The local process provides the Session ID 83, object ID 89, and loading rules 327 (from the event parameters table 312) as parameters of the method call. In response, the transfer application 60 executes its "Process Object" method as discussed with respect to FIG. 27.

If the upload file type is a message, step 230 represents the execution of a local process 23 called "Set Destination ID" which makes a method call to a transfer method 51 operated by the transfer application 60 called "Set Destination ID". The local process provides Session ID 83, object ID 89, and MQPUT parameters 325 (from the event parameters table 312) as parameters of the method call. In response, the transfer application 60 executes its "Set Destination ID" method (e.g. executes an MQPUT to the TS message queuing manager 47) as discussed with respect to FIG. 26.

Step 232, represents executing the Update Event local function as previously discussed to indicate that the event is complete.

Audit Log

FIG. 41 represents an exemplary audit log table 312 which may include a plurality of records 342, each representing a recorded audit event. The fields of the audit log 340 comprise a date field 344, a time field 346, a method called field 348, and a parameters passed field 350.

The date field 132 and the time field 134 establish the date and time at which the record 342 was written to the audit log table 84. The method called field identifies the transfer method 51 that was called and the parameters passed field 350 contains the parameters included in the method call. Each method called is logged in the audit table 312.

Back End Applications

In the exemplary embodiment, each back end application 38 exchanges files (as objects) with the transfer application 60 using messaging between a message queuing manager 39 local to the back end application 38 and the TS message queuing manager 47.

More specifically, the back end application 38 may: i) periodically use MQGET processing calls to its local message queuing manager 39 to obtain queued files being sent to the back end application 38 by the transfer application 60 (in response to a transfer client 24 making a "Set Destination ID" method call to the transfer application 60); and ii) use MQPUT processing calls to its local message queuing manager 39 specifying a local definition of a queue of the TS message queuing manager 47 that is associated with a transfer client 24 (for download to the transfer client 24).

It should be appreciated that the above described systems provide for unattended transfer of files over an open network between two unattended application such as the business process application server 18 and either the data processing module 50 of the web services server 46 or the back end application server 38.

It should also be appreciated that such transfer is facilitated by a self installing remote transfer client thereby eliminating the need for cumbersome FTP solutions.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. A system for secure automated transfer of a binary object between a transfer client message queuing manager and a transfer server message queuing manager over the Internet, the transfer client message queuing manager operating in conjunction with a remote file transfer client, the system comprising:

a database storing file transfer parameters in association with identification of the remote file transfer client, the database comprising:

an event key table, the event key table comprising a plurality of records, each record associating an event with identification of the remote file transfer client, each event being identified by an event key value stored in an event key field; and an event parameter table, the event parameter table comprising a plurality of records, each record associating an event parameter with the event key value, the event parameters comprising upload event parameters, the upload event parameters comprising:

an MQ Get parameter comprising data necessary for the transfer client to initiate an MQGET processing call to the transfer client message queuing manager and obtain a message in a queue identified in the processing call;

object destination parameters defining an MQ Put processing call to the transfer server message queuing manager and comprising an MQ Put parameter comprising all data necessary for the transfer application to initiate the MQ Put processing call to the transfer server, including a destination queue definition which provides for queuing the binary object within the defined queue for retrieval by a destination application, and a processor executing a transfer application, the transfer application comprising a plurality of file transfer methods available to the remote file transfer client making method calls to the transfer application, the plurality of transfer methods comprising:

a log on method executed in response to receiving a log-on method call from the remote file transfer client, the log on method call comprising identification of the remote file transfer client, the log on method comprising:

assigning a session ID to a web services session with the remote transfer client; and returning a response message to the transfer client, the response method comprising a session ID;

a retrieve active event keys method executed in response to the receiving a retrieve active event keys method call from the transfer client, the retrieve active event keys method call including the session ID, the retrieve active event keys method comprising:

obtaining, the identification of the remote transfer client associated with the session ID included in the method call;

obtaining, from the event key table, the event key value associated with the identification of the remote transfer client; and providing a response message to the transfer client, the response message including the event key value associated with identification of the remote transfer client;

a read event method executed in response to receiving a read event method call from the remote transfer client, the read event method call comprising the session ID and the event key value; the read event method comprising:

retrieving the event parameters associated with the event key value included in the method call from the event parameter table, and returning a response message to the transfer client, the response message comprising the MQ Get Parameter and the MQ Put Parameter;

an upload method operated in response to receiving an upload method call from the remote file transfer client, the upload method call comprising the session ID, a file name, and the binary object, the upload method comprising;

generating an object ID to associated with the binary object;

returning a response to the remote transfer client, the response comprising the object ID; and storing the binary object in a binary storage; and a destination method operated in response to receiving a destination method call from the transfer client, the destination method call comprising the session ID, the object ID, and the MQPUT parameter, the destination ID method comprises executing the MQ Put processing call to the transfer server message queuing manager, the processing call delivering the binary object associated with the object ID from the binary storage to the transfer server method queuing manager in conjunction with the destination queue definition.

2. A method of operating a system for secure automated transfer of a binary object between a transfer client message queuing manager and a transfer server message queuing manager over the Internet, the transfer client message queuing manager operating in conjunction with a remote file transfer client the method comprising:

storing file transfer parameters in association with identification of the remote file transfer client, by;

storing, in an event key table, a plurality of records, each record associating an event with identification of the remote transfer client, each event being identified by an event key value stored in an event key field; and storing, in an event parameter table, a plurality of records, each record associating a event parameter with the event key value, the event parameters comprising upload even parameters, the upload event parameters comprising:

an MQ get parameter comprising data necessary for the transfer client to initiate an MQGET processing call to the transfer client message gueuing mangers and obtain a message in a queue identified in the processing call;

an MQ Put parameter comprising all data necessary for the system to initiate the MQ Put processing call to the transfer server including a destination queue definition which provides for queuing of the binary object with in the defined queue of the transfer server for retrieval by a destination application;

in response to a log on method call from the remote transfer client, the log on method call comprising identification of the remote transfer client, executing a log on method, the log on method comprising:

assigning a session ID to a web services session with the remote transfer client, and returning a response message to the transfer client, the response method comprising a session ID;

in response to receiving a retrieve active event keys method call from the transfer client, the retrieve active event keys method call including the session ID, executed, a retrieve active event keys method, the retrieve active event keys method comprising:

obtaining, the identification of the remote transfer client associated with the session ID included in the method call;

obtaining, from the event key table, the event key value associated with the identification of the remote transfer client; and providing a response message to the transfer client, the response message including the event key value associated with identification of the remote transfer client;

in response to receiving a read event method call from the remote transfer client, the read event method call comprising the session ID and the event key value, executing a read event method, the read event method comprising:

retrieving the event parameters associated with the event key value included in the method call from the event parameter table, and returning a response message to the transfer client, the response message comprising the MQ Get Parameter and the MQ Put Parameter;

in response to receiving an upload method call from the transfer client, the upload method call comprising the session ID, a file name, and the binary object, executing an upload method, the upload method comprising generating an object ID to associate with the binary object and storing the binary object in a binary storage; and in response to receiving a destination method call from the transfer client, the destination method call comprising the session ID, the object ID, and the MQ Put parameter, executing a destination method, the destination method comprising executing the MQ Put processing call to the transfer server message queuing manager, the processing call delivering the binary object associated with the object ID received in the method call from the binary storage to the transfer server method queuing manager in conjunction with the destination queue definition.

* * * * *